United States Patent
Kudo et al.

(10) Patent No.: US 10,691,011 B2
(45) Date of Patent: Jun. 23, 2020

(54) IMAGING SYSTEM

(71) Applicant: Olympus Corporation, Hachioji-shi, Tokyo (JP)

(72) Inventors: Hiroki Kudo, Tokyo (JP); Kazuki Sakurai, Tokyo (JP); Keiji Kunishige, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 16/417,582

(22) Filed: May 20, 2019

(65) Prior Publication Data
US 2019/0369478 A1   Dec. 5, 2019

(30) Foreign Application Priority Data
May 29, 2018   (JP) ................. 2018-102515

(51) Int. Cl.
*G03B 31/06*   (2006.01)
*H04N 5/77*    (2006.01)

(52) U.S. Cl.
CPC ............. *G03B 31/06* (2013.01); *H04N 5/77* (2013.01)

(58) Field of Classification Search
CPC .................. G03B 31/06; H04N 5/77
See application file for complete search history.

(56) References Cited

U.S. PATENT DOCUMENTS

| | | | |
|---|---|---|---|
| 10,270,962 B1* | 4/2019 | Stout ............... | G06K 9/6215 |
| 2007/0199076 A1* | 8/2007 | Rensin ............. | H04L 29/06027 726/27 |
| 2010/0254543 A1* | 10/2010 | Kjolerbakken ..... | H04R 1/406 381/92 |
| 2011/0221910 A1* | 9/2011 | Nonaka ............. | H04N 5/77 348/207.1 |
| 2011/0221949 A1* | 9/2011 | Nonaka ............. | H04N 5/2251 348/333.02 |
| 2017/0034575 A1 | 2/2017 | Hongo | |
| 2018/0278841 A1* | 9/2018 | Ohtsuka ............ | G03B 17/566 |

FOREIGN PATENT DOCUMENTS

| JP | 5862320 B2 | 2/2016 |
|---|---|---|
| JP | 2017-034440 A | 2/2017 |

\* cited by examiner

*Primary Examiner* — Mishawn N. Hunter
(74) *Attorney, Agent, or Firm* — John C. Pokotylo; Pokotylo Patent Services

(57) ABSTRACT

An imaging system includes a sound recording apparatus and an imaging apparatus that is connected to the sound recording apparatus and records, as moving-image sounds, sounds collected by the sound recording apparatus. The imaging apparatus detects whether the sound recording apparatus has been connected thereto. Upon detecting that the sound recording apparatus has been connected to the imaging apparatus, the imaging apparatus sets a sound-recording condition associated with the sound recording apparatus as a sound-recording condition for the imaging apparatus in a sound recording process and records sounds under the sound-recording condition that has been set.

5 Claims, 34 Drawing Sheets

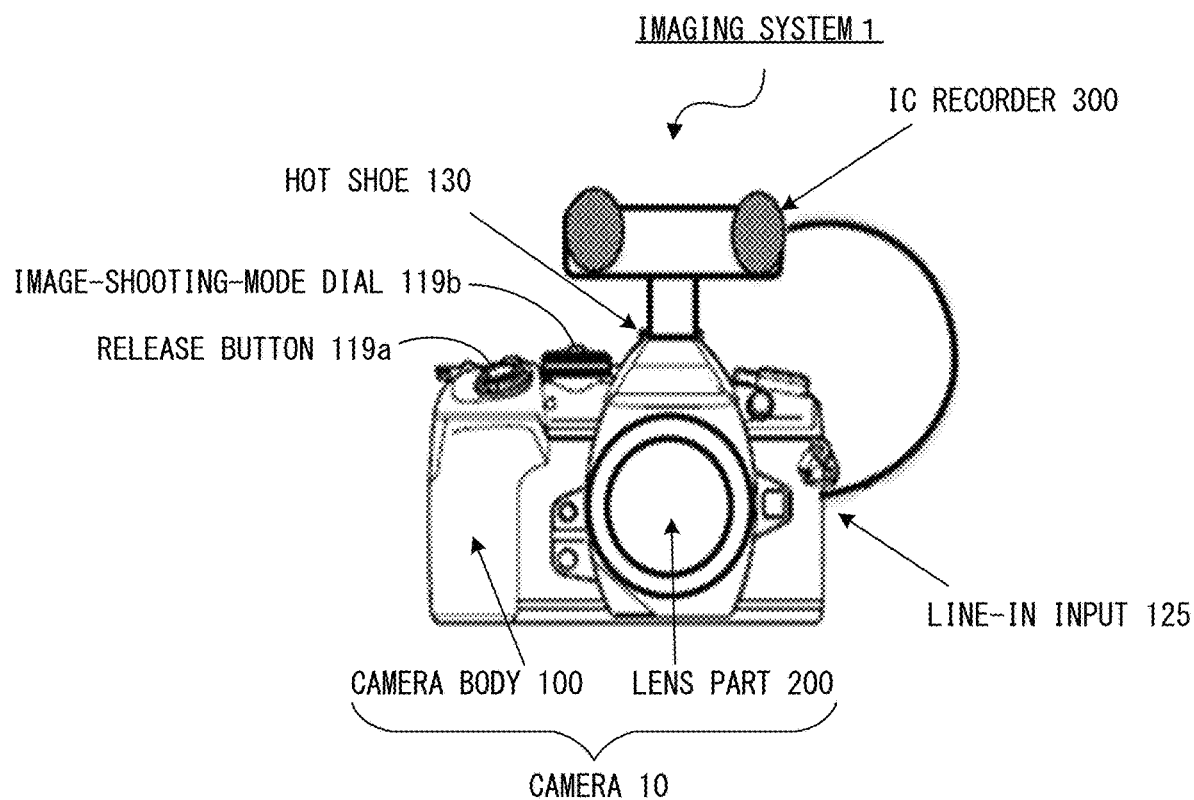
F I G. 1

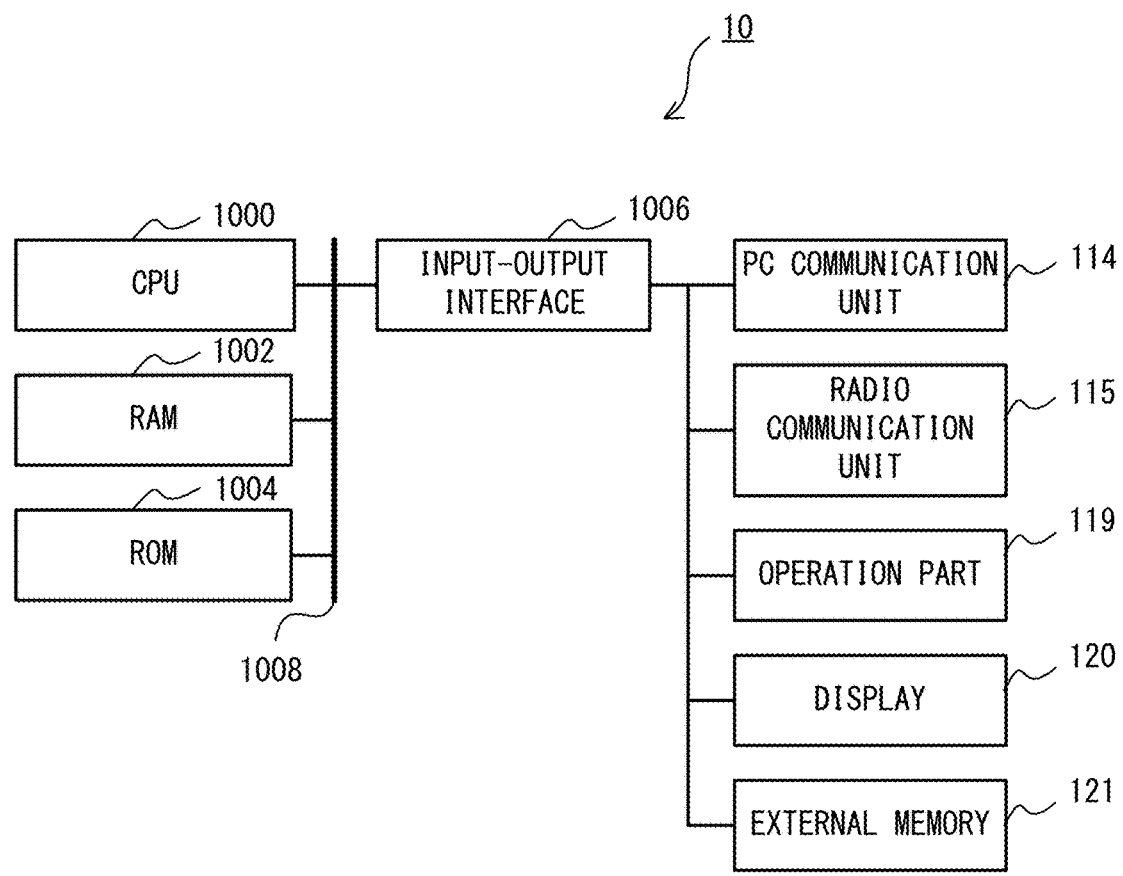
F I G. 4

| FLAG TABLE | STATE | | |
|---|---|---|---|
| HOT-SHOE-CONNECTION FLAG | 0 (NOT CONNECTED) | 1 (FLASH) | 2 (IC RECORDER) |
| HOT-SHOE-STATE CHANGE FLAG | 0 (STATE HAS NOT BEEN CHANGED) | 1 (STATE HAS BEEN CHANGED) | |
| LINE-IN-STATE FLAG | 0 (NOT CONNECTED YET) | 1 (CONNECTED) | |
| LINE-IN-STATE CHANGE FLAG | 0 (STATE HAS NOT BEEN CHANGED) | 1 (STATE HAS BEEN CHANGED) | |
| IC-RECORDER LINE-IN-CONNECTION FLAG | 0 (NOT CONNECTED YET) | 1 (CONNECTED) | |

FIG. 14

CAMERA BATTERY DISPLAY

| USED BATTERY | BATTERY-INFORMATION DISPLAY | |
|---|---|---|
| BATTERY WITHIN CAMERA BODY | 90 MIN | BATTERY (WITHOUFFIX) DISPLAY "MAXIMUM DURATION OF MOVING-IMAGE SHOOTING" OR "PERCENTAGE" |
| BATTERY WITHIN POWER BATTERY HOLDER | PBH 90 MIN | BATTERY ICON (WITH PBH SUFFIX) DISPLAY "MAXIMUM DURATION OF MOVING-IMAGE SHOOTING" OR "PERCENTAGE" |

IC-RECORDER BATTERY DISPLAY

| USED BATTERY | BATTERY-INFORMATION DISPLAY | |
|---|---|---|
| BATTERY WITHIN IC RECORDER | ICR 1490 HR | BATTERY ICON (WITH ICR SUFFIX) DISPLAY "MAXIMUM DURATION OF MOVING-IMAGE SHOOTING" OR "PERCENTAGE" |

FIG. 20

LINK-WITH-DIRECTIVITY WARNING ICON
| MICROPHONE DIRECTIVITY OF IC RECORDER | IC-RECORDER-INFORMATION DISPLAY |
|---|---|
| LINKED WITH CHANGE IN FIELD OF VIEW OF CAMERA | 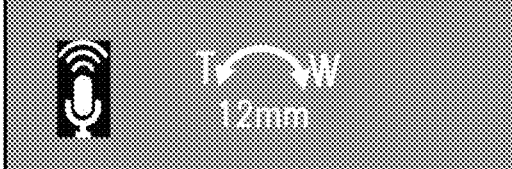 |
| NOT LINKED WITH CHANGE IN FIELD OF VIEW OF CAMERA | 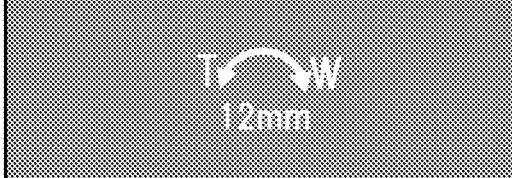 |
FIG. 21

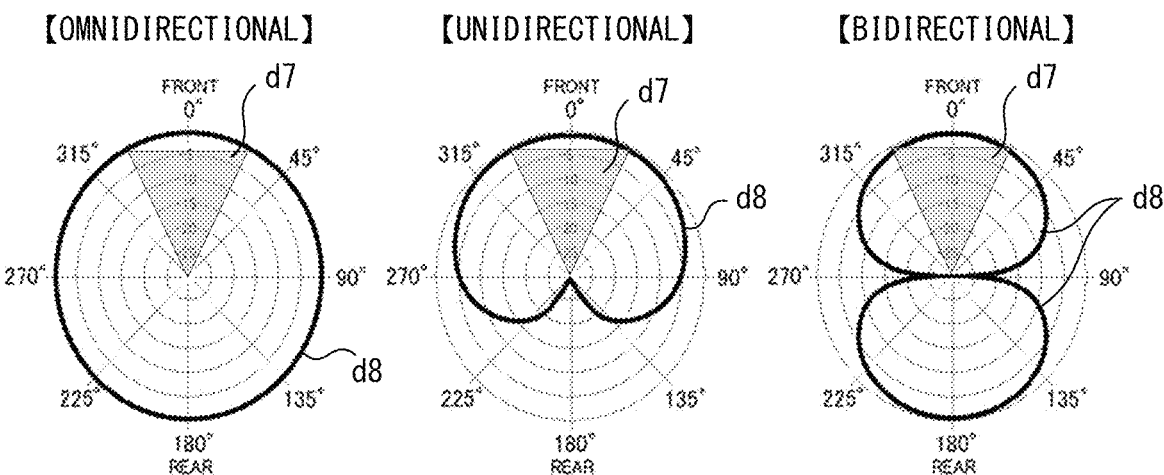
F I G. 2 2

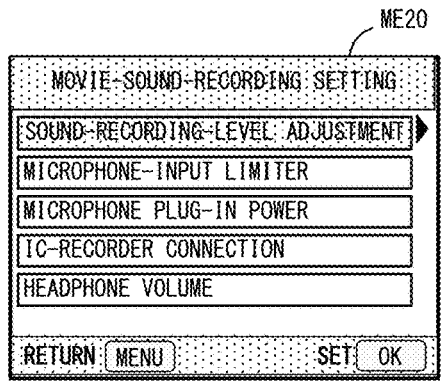
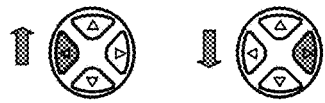
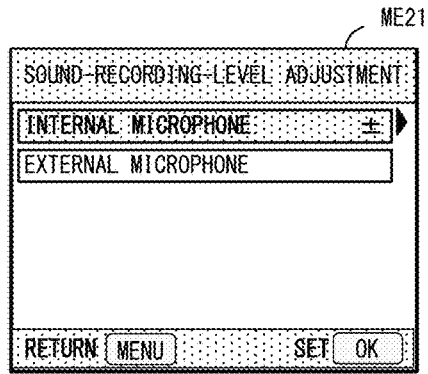
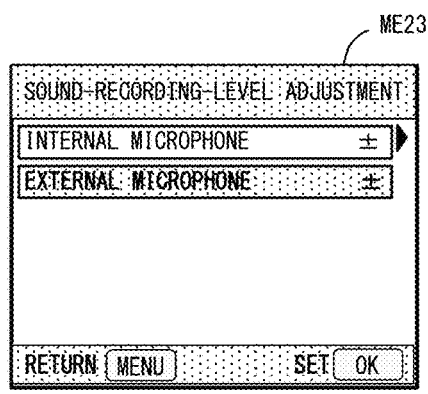
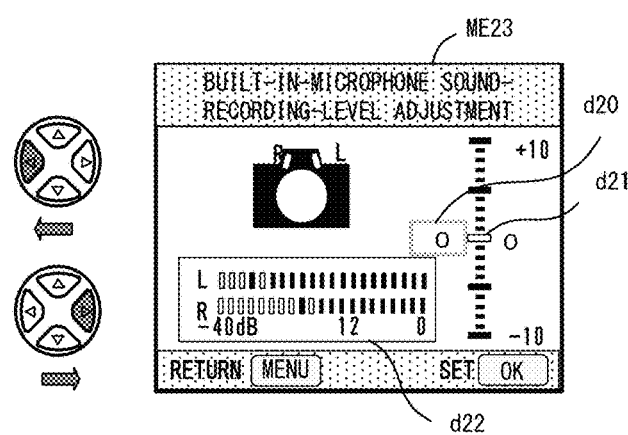
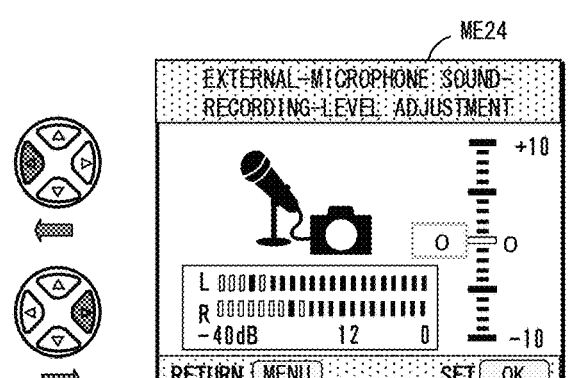
FIG. 29

IMAGING SYSTEM

CROSS REFERENCE TO RELATED APPLICATIONS

This application is based upon and claims the benefit of priority from prior Japanese Patent Application No. 2018-102515, filed May 29, 2018, the entire contents of which are incorporated herein by this reference.

BACKGROUND OF THE INVENTION

Field of the Invention

The present invention relates to an imaging system that records, as moving-image sounds, sounds acquired by an IC recorder.

Description of the Related Art

Digital cameras, and in particular digital single-lens-reflex cameras, are required to capture still images having a higher pixel count and quality than those of moving images and are thus mounted with image sensors much larger than those of ordinary video cameras. Meanwhile, the pixel counts of moving images have been rapidly increased in recent years as seen in a development of HD→FHD→4K→8K, and image sensors absolutely need to be large-sized to maintain high image qualities. Hence, as the shift from digital single-lens-reflex cameras, which are mainly provided with optical viewfinders, to mirrorless single-lens-reflex cameras, which are mainly provided with electrical viewfinders, has progressed, requirements have become higher not only for still-image shooting but also for moving-image shooting.

Recording high-quality sounds is also an important factor in moving-image shooting, unlike in still-image shooting. A digital camera is typically a noise source, and a microphone installed in a camera having a limited size and a sound processing circuit having a built-in camera cannot easily satisfy the need to record high-quality sounds. Hence, a digital camera is usually provided with an external microphone input terminal so that a dedicated external microphone that can collect high-quality sounds can be connected to the digital camera.

Some sound recording apparatuses called IC recorders include models provided with a high-performance dedicated sound processing circuit and sound recording memory. These high-performance IC recorders are used for applications such as the recording of the play in a music concert and the checking in the practice of musical instruments, and in recent years, there has been the strong need to use such a high-quality sound recording function to create moving-image works such as those pertaining to documentaries and bird watching. Accordingly, a sound recording apparatus to be connected to a single-lens-reflex digital camera so as to provide this camera with high-quality sound data has been proposed (Japanese Laid-open Patent Publication No. 2017-34440).

SUMMARY OF THE INVENTION

An imaging system in accordance with an aspect of the present invention includes a sound recording apparatus and an imaging apparatus that is connected to the sound recording apparatus and records, as moving-image sounds, sounds collected by the sound recording apparatus. The imaging apparatus detects whether the sound recording apparatus has been connected thereto. Upon detecting that the sound recording apparatus has been connected to the imaging apparatus, the imaging apparatus sets a sound-recording condition associated with the sound recording apparatus as a sound-recording condition for the imaging apparatus in a sound recording process and records sounds under the sound-recording condition that has been set.

BRIEF DESCRIPTION OF THE DRAWINGS

The present invention will be more apparent from the following detailed description when the accompanying drawings are referenced.

FIG. 1 illustrates the configuration of an imaging system in accordance with embodiments of the present invention;

FIG. 4 illustrates an example of the hardware configuration of a system controller;

FIG. 10 illustrates examples of menu screens that have undergone a grayout process or the like;

FIG. 14 illustrates a table summarizing flags;

FIG. 20 illustrates tables illustrating items to be displayed as camera battery information and IC-recorder battery information;

FIG. 21 is a table illustrating details of a link-with-directivity warning icon;

FIG. 22 illustrates exemplary directivity graphs for microphones of an IC recorder;

FIG. 29 illustrates examples of sound-recording-level adjustment menus;

DESCRIPTION OF THE EMBODIMENTS

Figure 2A:
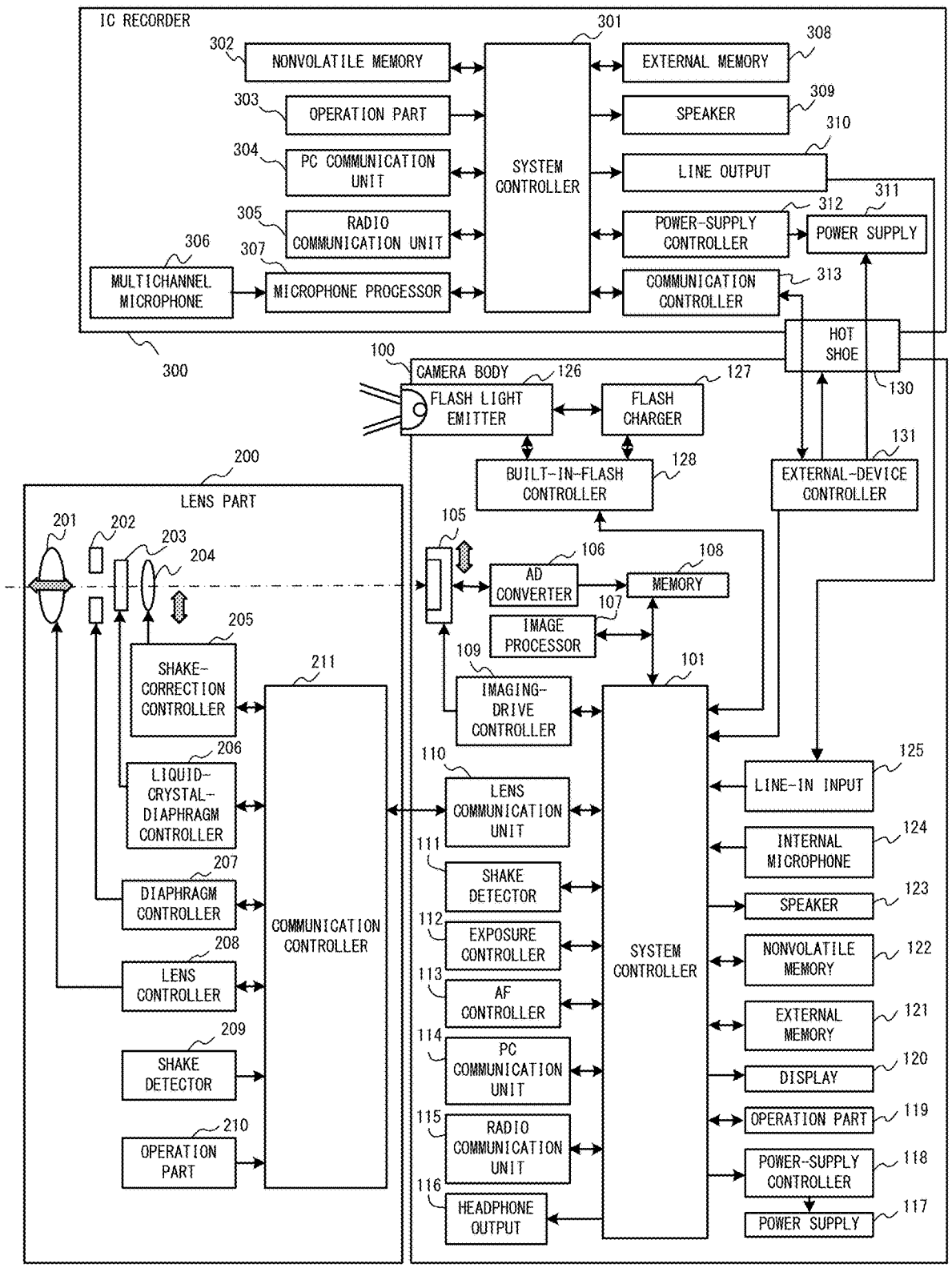
FIG. 2A is a block diagram mainly illustrating the electrical configuration of an imaging system.

A microphone installed in a digital camera and an IC recorder have large differences in sound-recording characteristic and sound-recording condition therebetween, and hence in order to collect sounds with the IC recorder, items of a sound-recording menu of the camera need to be set to optimum values in accordance with IC-recorder specifications. However, various items need to be set for sound-recording conditions, and a long time will be required to make the setting, thereby offering a hindrance to the use of the IC recorder.

Accordingly, it will be desirable to provide an imaging system that allows settings to be easily made for an IC recorder connected thereto.

The following describes embodiments of the present invention by referring to the drawings. FIG. 1 illustrates the configuration of an imaging system 1 in accordance with embodiments. The imaging system 1 includes a camera 10 and an IC recorder 300. The camera 10 is indicated as a digital single-lens-reflex camera that includes a camera body 100 and a lens part 200. The camera 10 may be a lens-fixed camera.

The IC recorder 300 is a sound recording apparatus that stores sound data in a memory. The IC recorder 300 is mounted on a hot shoe 130 provided at an upper portion of the camera body 100, wherein an external flash can be attached to the hot shoe 130. A line-in input 125 for inputting sounds that are provided on a right side-surface of the camera body 100 is connected to the IC recorder 300 by a cable, and sounds collected by the IC recorder 300 are input to the camera body 100.

A release button 119a and an image-shooting-mode dial 119b are disposed together as an operation part 119 on a top surface of the camera body 100. A display 120 (not illustrated) is disposed on a back surface of the camera body 100. According to such a configuration, sounds collected by the IC recorder 300 are recorded by the IC recorder 300, and simultaneously these sounds are recorded as moving-image sounds by the camera 10. The camera 10 may be referred to as an imaging apparatus. The IC recorder 300 may be referred to as a sound recording apparatus.

FIG. 2A is a block diagram mainly illustrating the electrical configuration of the imaging system 1. The lens part 200 includes an image-shooting lens 201, a diaphragm mechanism 202, a liquid crystal diaphragm 203, and a shake correction lens 204.

The image-shooting lens 201 is an optical system for forming an image of a subject. The image-shooting lens 201 may include a zoom optical system and a focus adjustment system. The diaphragm mechanism 202 and the liquid crystal diaphragm 203 adjust the amount of a pencil of incident light from a subject. The shake correction lens 204 is moved in a direction perpendicular to an optical axis so as to cancel out shakes of the camera 10.

The lens part 200 includes a shake-correction controller 205, a liquid-crystal-diaphragm controller 206, a diaphragm controller 207, a lens controller 208, a shake detector 209, an operation part 210, and a communication controller 211.

In accordance with the amount of shakes, the shake-correction controller 205 controls the movement of the shake correction lens 204 in a direction perpendicular to the optical axis. The liquid-crystal-diaphragm controller 206, which serves to change a permeability, controls the aperture size of the liquid crystal diaphragm 203 in accordance with an instruction from the camera body 100 so as to adjust the amount of a pencil of incident light from a subject. Similarly, the diaphragm controller 207 controls the aperture size of the diaphragm mechanism 202 in accordance with an instruction from the camera body 100 so as to adjust the amount of a pencil of incident light from the subject. However, as the diaphragm mechanism 202 produces noise while being driven, the liquid crystal diaphragm 203, which produces no sounds, adjusts the light volume while a moving image is being shot.

The lens controller 208 moves a predetermined lens included in the image-shooting lens 201 in accordance with an instruction for zooming or a focus adjustment from the camera body 100. The shake detector 209 detects the amount of shakes affecting the lens part 200. The operation part 210 is, for example, a button provided at the lens part 200 so as to manually adjust a focus. The communication controller 211 controls a communication between the lens part 200 and the camera body 100.

The camera body 100 includes a system controller 101. The system controller 101 performs centralized control of the camera 10 and the camera body 100. The system controller 101 includes, for example, a processor such as a central processing unit (CPU) and an application specific integrated circuit (ASIC). For example, a processor such as a CPU may read and run a predetermined control program stored in a nonvolatile memory 122 (this will be described hereinafter) so as to be operated as the system controller 101 and execute various sequences.

The camera body 100 includes an imaging part 105, an AD converter 106, an image processor 107, and a memory 108. The imaging part 105 includes a shutter 105a, an image sensor 105b, and a shake correction mechanism 105c (none of these are illustrated). The shutter 105a and the image sensor 105b are located on an optical axis of the image-shooting lens 201.

The shutter 105a, which is opened or closed for a pencil of light of an image of a subject that is formed by the image-shooting lens 201, includes, for example, a publicly known lens shutter or a focal plane shutter.

The image sensor 105b, which is a two-dimensional solid-state imaging sensor such as a CMOS image sensor or a CCD image sensor, includes: color filters disposed on a front surface of the image sensor 105b in a Bayer arrangement; and photoelectric conversion elements such as photodiodes arranged in association with the color filters. An imaging region is formed by a pixel group that includes color filters and photoelectric conversion elements associated therewith. The image sensor 105b receives, by means of the individual pixels, light collected by the image-shooting lens 201, converts the received light into a photocurrent, accumulates this photocurrent in a capacitor, and outputs this photocurrent to the AD converter 106 as an analog voltage signal (image signal). The shake correction mechanism 105c holds the image sensor 105b and is moved in a direction such that shakes of the camera body 100 are canceled.

The AD converter 106 converts an image signal photoelectrically converted by the image sensor 105b from analog to digital and outputs the resultant signal to the memory 108 as image data. The memory 108 temporarily stores various data such as image data provided by the AD converter 106 and image data processed by the image processor 107.

The image processor 107 reads image data temporarily stored in the memory 108 and performs various types of image processing such as white-balance correction processing, synchronization processing, and color-conversion processing for the image data. In addition, the image processor 107 compresses image data to be recorded in an external memory 121 (this will be described hereinafter) and decompresses image data read from the external memory 121.

The camera body 100 also includes an imaging-drive controller 109, a lens communication unit 110, a shake detector 111, an exposure controller 112, an AF controller 113, a PC communication unit 114, and a radio communication unit 115.

The imaging-drive controller 109 performs various types of operation control and drive control of the imaging part 105. The lens communication unit 110 communicates with the communication controller 211 of the lens part 200 and controls a data communication between the camera body 100 and the lens part 200. The shake detector 111 detects the amount of shakes of the camera body 100.

The exposure controller 112 calculates the luminance of a subject using image data temporarily stored in the memory 108. Of course, the luminance of a subject may be calculated using a dedicated photometric sensor.

The AF (auto focus) controller 113 extracts a high frequency component from image data temporarily stored in the memory 108 and detects a focusing position from a contrast value. The PC communication unit 114 controls a communication between the camera body 100 and a personal computer (PC) connected thereto. The PC communication unit 114 is, for example, a USB interface. A radio communication unit 115 controls a radio communication (e.g., wireless LAN or Bluetooth®) with an external device.

The camera body 100 also includes a headphone output 116, a power supply 117, a power-supply controller 118, an operation part 119, a display 120, an external memory 121, a nonvolatile memory 122, a speaker 123, an internal microphone 124, a line-in input 125, a hot shoe 130, and an external-device controller 131.

The headphone output 116 outputs a sound signal to a headphone. The power supply 117 supplies power necessary for operations of components of the camera body 100. The power supply 117 includes, for example, a power supply battery such as a rechargeable battery. The power-supply controller 118 adjusts a voltage of the power supply 117 to a predetermined voltage so as to supply power to components. The power-supply controller 118 detects a power-supply voltage and remaining battery level of a battery that constitutes the power supply 117.

The operation part 119 is an input means for inputting an instruction from a user. The operation part 119 includes operation members such as the above-described release button 119a and image-shooting-mode dial 119b, a moving-image button 119c, a D-pad 119d, an OK button 119e, a slate-tone-function button 119f, and various input keys. The moving-image button 119c, the D-pad 119d, the OK button 119e, and the slate-tone-function button 119f are disposed on a back surface of the camera body 100.

The release button 119a includes a two-stage switch provided with a first release switch and a second release switch. Pressing the release button 119a halfway turns on the first release switch, and completely pressing the release button 119a turns on the second release switch. Turning on the first release switch causes the system controller 101 to perform an image-shooting preparation sequence such as AE processing or AF processing. Turning on the second release switch causes the system controller 101 to perform a still-image-shooting sequence and thus shoot an image.

The moving-image button 119c gives an instruction to shoot a moving image. The D-pad 119d selects an item or a condition on, for example, a menu screen displayed by the display 120, and the OK button 119e sets the selected condition. The D-pad 119d includes four buttons: an up button, a down button, a right button, and a left button.

The display 120 performs live-view displaying or playback displaying of a shot image recorded in the external memory 121 and further displays a menu screen for displaying, for example, an exposure control value or for setting, for example, an image-shooting mode. The display 120 is, for example, a display apparatus that includes a display such as a liquid crystal monitor or a an organic EL display.

The external memory 121 is, for example, a record medium that can be attached to and detached from the camera body 100. The external memory 121 stores image data compressed by the image processor 107, sound data, and data associated with the sound data. Sound data is stored after being synchronized with a shot image as moving-image sounds. The storage medium for storing image data, sound data, and the like is not limited to the external memory 121 and may be a storage medium such as a hard disk installed in the camera body 100.

The nonvolatile memory 122 is an electrically overwritable nonvolatile memory. The nonvolatile memory 122 stores various parameters necessary for operations of the camera 10 and control programs to be run by the system controller 101. The nonvolatile memory 122 stores data on flags such as hot-shoe-connection flags (these flags will be described hereinafter).

The nonvolatile memory 122 also stores sound-recording conditions (e.g., sound-recording adjustment, microphone limiter) for the IC recorder 300. Sound-recording conditions (e.g., sound-recording adjustment, microphone limiter) may be stored for each type of IC recorder 300. A plurality of sound-recording conditions for the IC recorder 300 may be stored collectively as a sound-recording-apparatus setting set.

The speaker 123 outputs a warning sound or sounds recorded for a moving image. The internal microphone 124 is installed in the camera body 100 so as to collect sounds. The line-in input 125 serves to input a sound signal output from the IC recorder 300 or an external microphone. The line-in input 125 is provided with a line-in switch for detecting the connection (insertion) of, for example, an external microphone.

The camera body 100 includes a flash light emitter 126, a flash charger 127, and a built-in-flash controller 128. The flash light emitter 126 includes, for example, a reflective umbrella and a luminous tube such as a xenon (Xe) tube. The flash light emitter 126 receives a light-emission instruction from the built-in-flash controller 128 and emits light using energy accumulated in a capacitor of the flash charger 127.

The flash charger 127 accumulates energy required for the flash light emitter 126 to emit light. The flash charger 127 includes a booster circuit that boosts a voltage and a capacitor that accumulates energy of the boosted voltage. The built-in-flash controller 128 controls a charging operation performed by the flash charger 127 and a light-emitting operation performed by the flash light emitter 126.

The camera body 100 includes the hot shoe 130 and the external-device controller 131. As indicated above, the hot shoe 130 is a mount to which an external flash or an external device such as the IC recorder 300 is to be attached.

The external-device controller 131 communicates with an external device mounted on the hot shoe 130 so as to control this external device. For example, the external-device controller 131 may control an external flash mounted on the hot shoe 130. Alternatively, the external-device controller 131 may control the IC recorder 300 mounted on the hot shoe 130.

Figure 3:
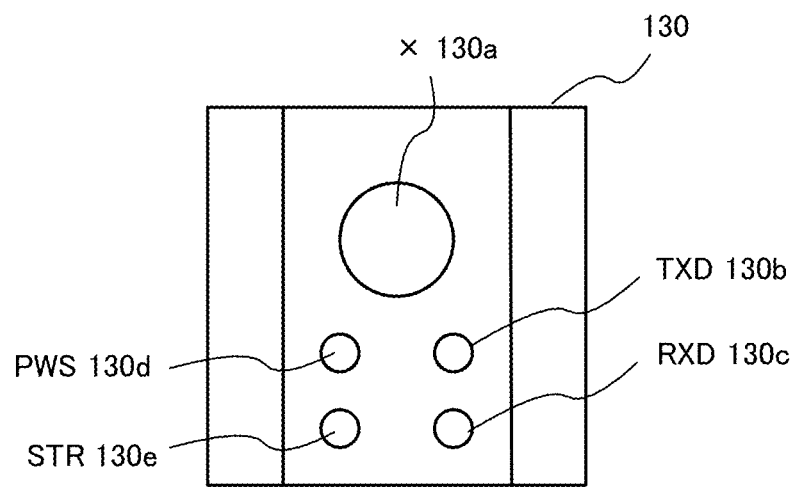
FIG. 3 illustrates an example of the arrangement of terminals on a hot shoe.

FIG. 3 illustrates an example of the arrangement of terminals on the hot shoe 130. The hot shoe 130 includes an X terminal 130a, a TXD terminal 130b, a RXD terminal 130c, a PWS terminal 130d, and an STR terminal 130e.

The X terminal 130a is a light-emission trigger terminal that outputs a light-emission trigger to a flash connected to this terminal. The TXD terminal 130b is a data transmission terminal that transmits data from the camera body 100 to an external device (external flash or IC recorder 300) connected to this terminal. The RXD terminal 130c is a data reception terminal that allows the camera body 100 to receive data from an external device connected to this terminal. The PWS terminal 130d is a power supply terminal that supplies power to an external device connected to this terminal. The STR terminal 130e is a flash-connection detection terminal that detects the connection of an external flash.

The system controller 101 is connected to, for example, the image processor 107 to the line-in input 125, the built-in-flash controller 128, and the external-device controller 131. When the user operates any of the operation members of the operation part 119, the system controller 101 performs various sequences that depend on the user operation.

Figure 2B:
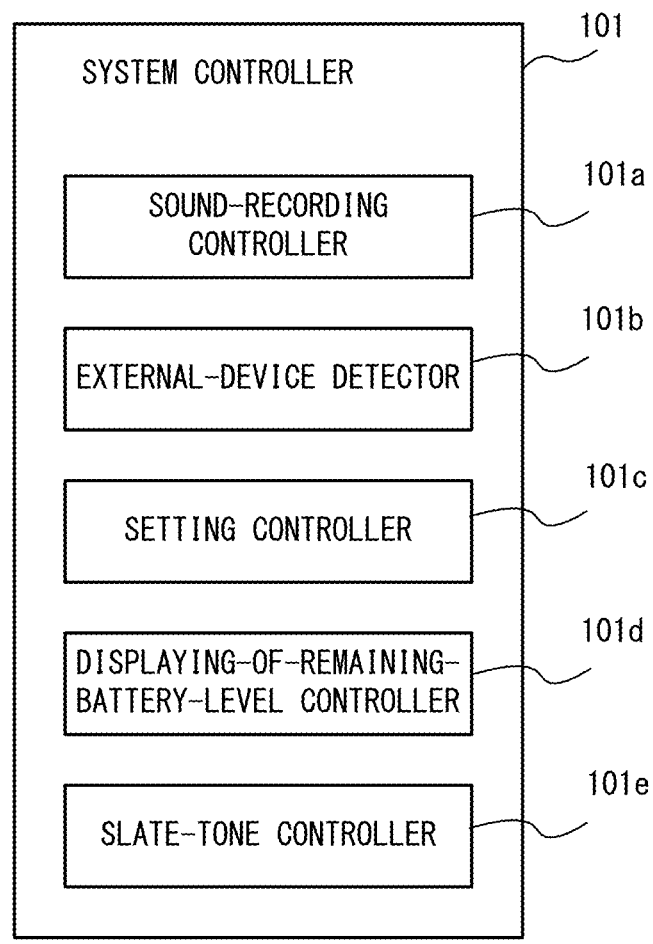
FIG. 2B is a block diagram illustrating the functional configuration of a system controller.

FIG. 2B is a block diagram illustrating the functional configuration of the system controller 101. The system controller 101 includes a sound-recording controller 101a, an external-device detector 101b, a setting controller 101c, a displaying-of-remaining-battery-level controller 101d, and a slate-tone controller 101e.

The sound-recording controller 101a controls sound recording while a moving image is being shot and records sound data in the external memory 121 as moving-image sounds. The sound-recording controller 101a records, in the external memory 121 as sound data, a sound signal from the internal microphone 124 or a sound signal from an external microphone or the IC recorder 300 input via the line-in input 125. The sound-recording controller 101a processes sounds under, for example, a sound-recording condition set by the setting controller 101c, digitalizes the sound under predetermined conditions (e.g., sampling frequency, compressibility), and records the digitalized sound in the external memory 121.

The external-device detector 101b detects the type of an external device connected to the camera 10. In particular, the external-device detector 101b detects the type of an external device mounted on the hot shoe 130 by communicating with this external device via the terminal of the hot shoe 130. The external-device detector 101b identifies an external flash or the IC recorder 300 as an external device. In addition, when a cable of the IC recorder 300 is connected to the line-in input 125, the external-device detector 101b may consider, in terms of expected use of the IC recorder, that the IC recorder 300 has been connected to the camera. Details of the external-device detector 101b will be described hereinafter with reference to an IC-recorder mounting process (1) depicted in FIG. 8 and an IC-recorder mounting process (2) depicted in FIG. 13. The external-device detector 101b may also be referred to as a sound-recording-apparatus detector.

When the IC recorder 300 is connected to the camera 10, the setting controller 101c sets a predetermined sound-recording condition for the IC recorder 300. In particular, the setting controller 101c reads a sound-recording condition directed to the IC recorder 300 from the nonvolatile memory 122 and sets this condition. The setting controller 101c performs a grayout process of a menu screen for items (parameters) fixed under the sound-recording condition directed to the IC recorder 300. Owing to the grayout process, the user can easily determine items that cannot be changed under the sound-recording condition directed to the IC recorder 300.

The displaying-of-remaining-battery-level controller 101d displays a remaining battery level based on a display type selected on the menu screen. Display types include, for example, a "remaining battery level (%)", a "maximum duration of moving-image shooting based on remaining battery level", a "shorter of 'maximum duration of sound recording calculated from remaining battery level' and 'maximum duration of sound recording calculated from remaining battery level and remaining capacity of memory'". The displaying-of-remaining-battery-level controller 101d will be described hereinafter with reference to FIGS. 16A and 16B.

The slate-tone controller 101e controls generation of a slate tone. A slate tone refers to a signal to be mixed with (inserted into) a sound so as to provide synchronization in compiling two pieces of sound record data recorded for the same sound source. When the IC recorder 300 is connected to the camera 10, the sound-recording controller 101a of the camera 10 causes sound signals collected by the IC recorder 300 and input via the line-in input 125 to be digitally recorded in the external memory 121 as moving-image sound data. At the same time, collected sounds are digitally recorded in an external memory 308 of the IC recorder 300. Recording slate tones for the two pieces of sound data during image shooting allows the moving-image sound data within the external memory 121 to be easily replaced with the sound data from the IC recorder 300 after image shooting is completed.

FIG. 4 illustrates an example of the hardware configuration of the system controller 101. The system controller 101 includes a central processing unit (CPU) 1000, a random access memory (RAM) 1002, a read only memory (ROM) 1004, and an input-output interface (IF) 1006. The RAM 1002 constitutes the memory 108. The ROM 1004 constitutes the nonvolatile memory 122. The input-output interface (IF) 1006 has, for example, the PC communication unit 114 or the external memory 121 connected thereto. The CPU 1000, the RAM 1002, the ROM 1004, and the input-output IF 1006 are connected to each other by a bus line 1008. The system controller 101 is implemented by software processing performed by the CPU 1000 reading a control program from the ROM 1004.

FIG. 2A should be referred to again. The IC recorder 300 includes a system controller 301, a nonvolatile memory 302, an operation part 303, a PC communication unit 304, a radio communication unit 305, a multichannel microphone 306, and a microphone processor 307.

The system controller 301 performs centralized control of the IC recorder 300. For example, the system controller 301 may include a processor such as a central processing unit (CPU) and an application-specific integrated circuit (ASIC). For example, a processor such as a CPU may perform various sequences by reading and running a predetermined control program stored in the nonvolatile memory 302 so as to be operated as the system controller 301.

The system controller 301 digitally records collected sounds in the external memory 308 (this memory will be described hereinafter) in a recording mode that has been set. The IC recorder 300 is typically provided with a microphone with a high sound-collecting quality and sound recording functions achieving a much higher performance and sound quality than the camera 10, e.g., sound processing for reducing noise such as wind noise, a zoom sound-recording function, and a linear PCM sound-recording function enabling high resolution.

The nonvolatile memory 302 is an electrically over writable nonvolatile memory and stores various parameters necessary for operations of the IC recorder 300. The nonvolatile memory 302 stores a control program to be run by the system controller 301.

The operation part 303 is an input means for inputting an instruction from a user. For example, the operation part 303 may include a power button, a sound-recording button, and other operation buttons. The PC communication unit 304 controls a communication between the IC recorder 300 and a personal computer (PC) connected to the IC recorder 300. The PC communication unit 304 is, for example, a USB interface. The radio communication unit 305 controls a radio communication (e.g., wireless LAN or Bluetooth®) between an external device and the IC recorder 300.

The multichannel microphone 306 serves to collect sounds and includes a plurality of microphones. The microphone processor 307 processes (e.g., amplifies) a sound signal acquired by the multichannel microphone 306. The system controller 301 achieves various directivities by mixing, at a predetermined ratio, microphone signals of the multichannel microphone 306 that have been processed by the microphone processor 307.

The IC recorder 300 includes the external memory 308, a speaker 309, a line output 310, a power supply 311, a power-supply controller 312, and a communication controller 313.

The external memory 308, which is, for example, a storage medium that can be attached to and detached from the IC recorder 300, has sound data and data associated with the sound data stored therein. The storage medium for storing sound data and the like is not limited to an attachable/detachable external memory and may be a storage medium such as a hard disk installed in the IC recorder 300. The speaker 309 replays stored sounds. The line output 310 outputs collected analog sound signals to an external apparatus (e.g., camera 10) via an output terminal.

The power supply 311 supplies power necessary for operations of components of the IC recorder 300 and includes, for example, a power supply battery such as a rechargeable battery. The power-supply controller 312 controls the power supply 311 and detects a power-supply voltage and remaining battery level of a battery that constitutes the power supply 311. The power-supply controller 312 controls the switching of power supplied from the camera body 100 to the IC recorder 300 that is performed via the hot shoe 130. The communication controller 313 controls a communication with the camera 10 that is performed via the hot shoe 130.

Figure 5:
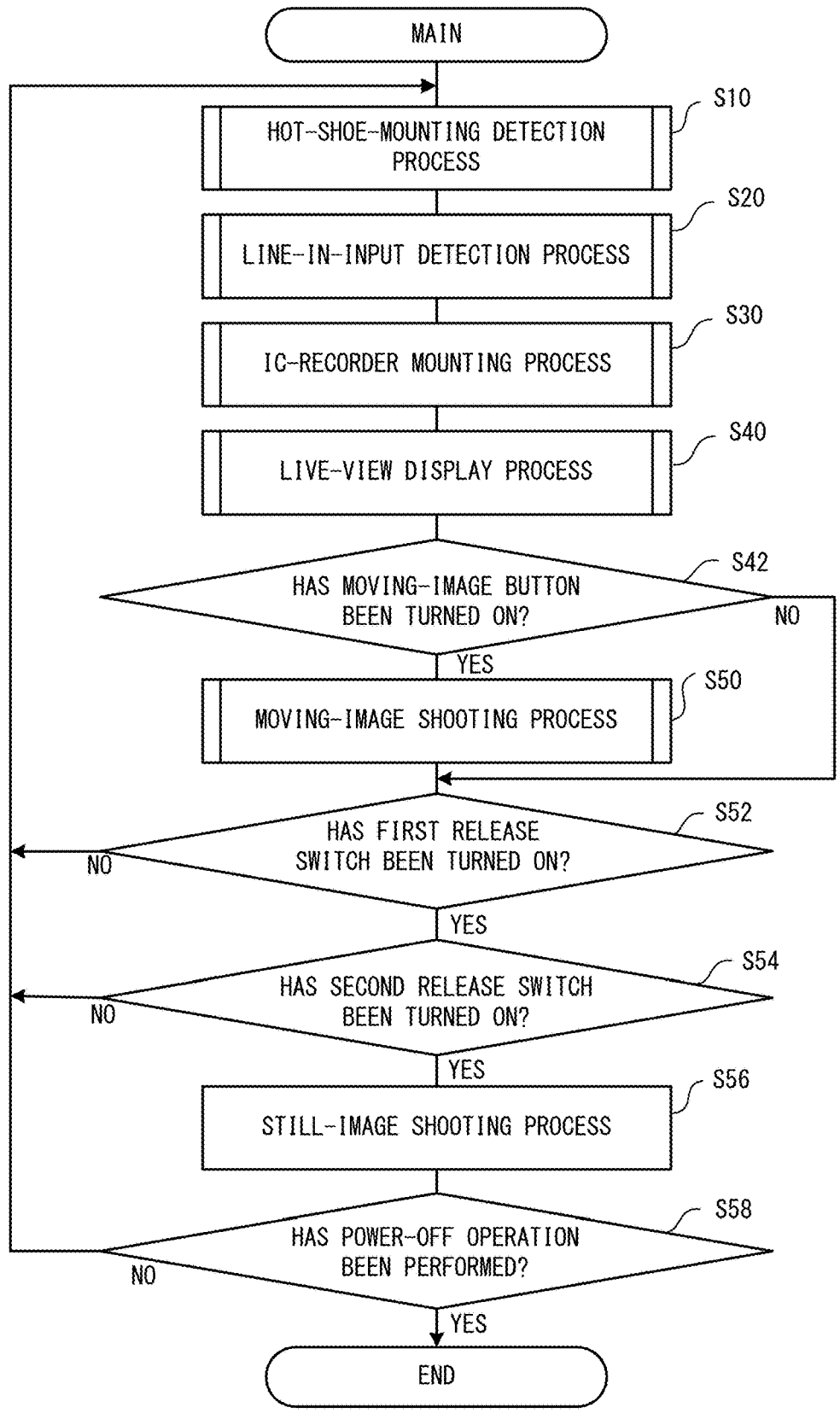
FIG. 5 is a main flowchart illustrating the entirety of processing performed by an imaging system.

FIG. 5 is a main flowchart illustrating the entirety of processing performed by the imaging system 1. The process depicted in FIG. 5 is performed mainly by the system controller 101 of the camera 10. First, descriptions will be given of the overview of the entirety of the processing.

The system controller 101 performs a hot-shoe-mounting detection process (step S10). The hot-shoe-mounting detection process is such that the system controller 101 performs a communication with an external device mounted on the hot shoe via the hot shoe (also referred to as a hot-shoe communication) so as to identify the mounted external device from data received therefrom and determines whether the external device is an IC recorder 300.

A system controller 230 performs a line-in-input detection process (step S20). The line-in-input detection process is such that the system controller 230 determines whether an external microphone or the like has been connected to the line-in input 125 of the camera 10.

The system controller 230 performs an IC-recorder mounting process (step S30). The IC-recorder mounting process is such that after detecting the mounting of the IC recorder 300, the system controller 230 makes camera settings for the IC recorder 300.

The system controller 230 performs a live-view display process (step S40). The live-view display process is such that the system controller 230 performs an IC-recorder-status display process and a slate-tone process.

The system controller 230 determines whether the moving-image button 119c has been turned on (step S42). Upon determining that the moving-image button 119c has been turned on (YES in step S42), the system controller 230 performs a moving-image shooting process (step S50).

Upon determining that the moving-image button 119c has not been turned on (NO in step S52), the system controller 230 determines whether the first release switch has been turned on (step S52). Upon determining that the first release switch has not been turned on (NO in step S52), the system controller 230 returns to step S10.

Upon determining that the first release switch has been turned on (YES in step S52), the system controller 230 determines whether the second release switch has been turned on (step S54). Upon determining that the second release switch has not been turned on (NO in step S54), the system controller 230 returns to step S10. Upon determining that the second release switch has been turned on (YES in step S54), the system controller 230 performs a still-image shooting process (step S56).

The system controller 230 determines whether a power-off operation has been performed (step S58). Upon determining that the power-off operation has not been performed (NO in step S58), the system controller 230 returns to step S10. Upon determining that the power-off operation has been performed (YES in step S58), the system controller 230 performs an end process.

Figure 6:
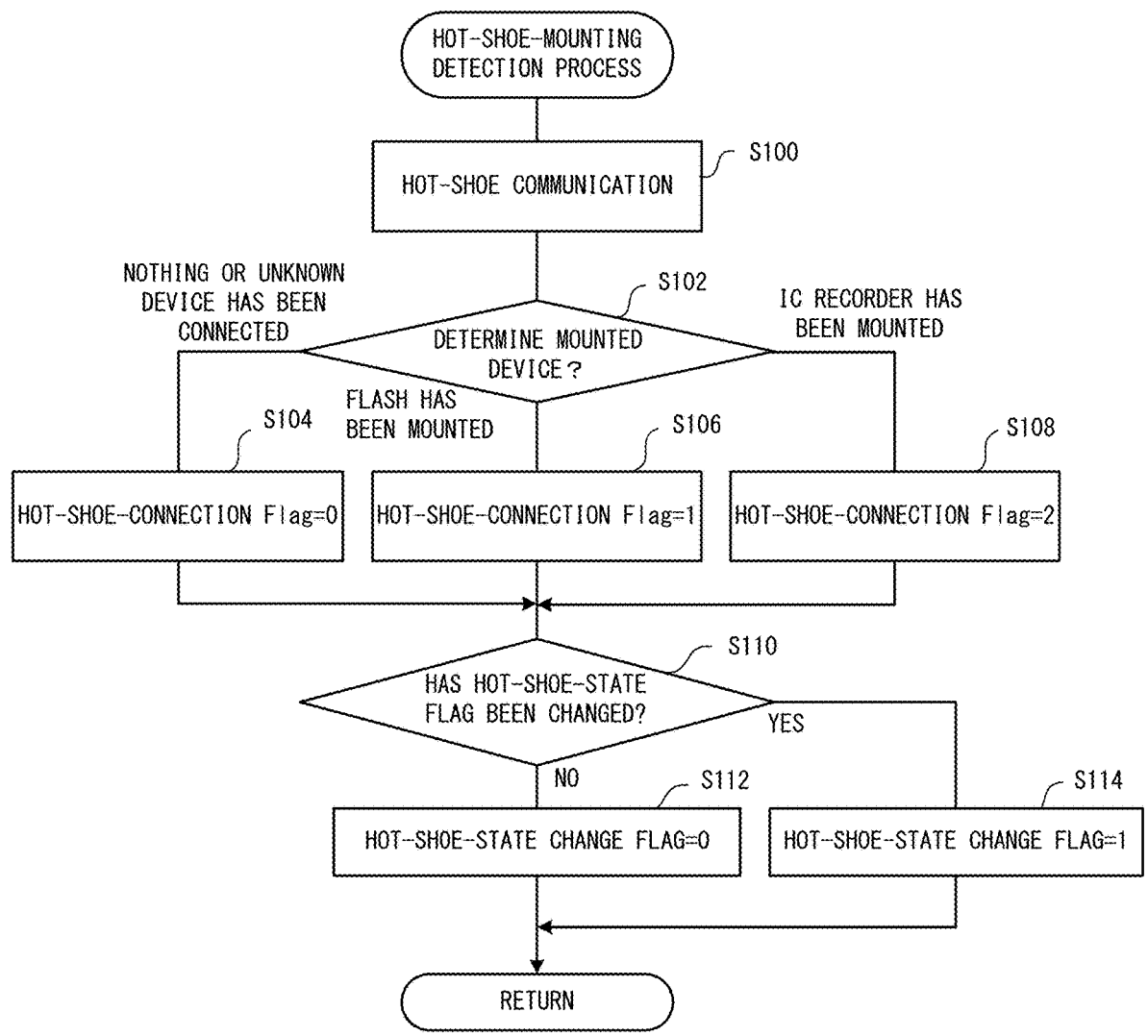
FIG. 6 illustrates a subroutine of a hot-shoe-mounting detection process.

The following describes details of the main processes described above. First, descriptions will be given of the hot-shoe-mounting detection process in step S10. FIG. 6 illustrates a subroutine of the hot-shoe-mounting detection process.

The external-device detector 101b performs a communication via the hot shoe 130 under the control of the external-device controller 131 (step S100). The external-device detector 101b determines a mounted device in accordance with a result of the communication (step S102). When the external-device detector 101b determines that nothing has been connected to, or an unknown device has been mounted on, the hot shoe 130, the system controller 101 sets hot-shoe-connection flag=0 (step S104).

When it is determined in accordance with a result of the communication that an external flash has been connected to the hot shoe 130, the system controller 101 sets hot-shoe-connection flag=1 (step S106). When it is determined in accordance with the result of the communication that an IC recorder 300 has been connected to the hot shoe 130, the system controller 230 sets hot-shoe-connection flag=2 (step S108).

By making a comparison with a previous hot-shoe-mounting detection result, the system controller 101 determines whether the hot-shoe-connection flag has been changed (step S110). When it is determined that the hot-shoe-connection flag has not been changed (NO in step S110), the system controller 230 sets hot-shoe-state change flag=0 (step S112). When it is determined that the hot-shoe-connection flag has been changed (YES in step S110), the system controller 230 sets hot-shoe-state change flag=1 (step S114). Finally, the hot-shoe-mounting detection process is finished, and the flow shifts to step S20 in FIG. 5.

As described above, the mounting of the IC recorder 300 is detected through a communication between the IC recorder 300 and the camera 10. Possible methods for the communication include:

(1) A method wherein the communication is performed via a U-ART terminal of the hot shoe 130 under the control of the external-device controller 131.

(2) A method wherein the communication is performed via a PC connection terminal such as a USB terminal under the control of the PC communication unit 114.

(3) A method wherein the communication is performed via, for example, Wi-Fi under the control of the radio communication unit 115.

The descriptions above are based on an example of the method (1). However, the present invention is not limited to the method (1), and the communication in accordance with embodiments may be the method (2) or (3), as appropriate.

Figure 7:
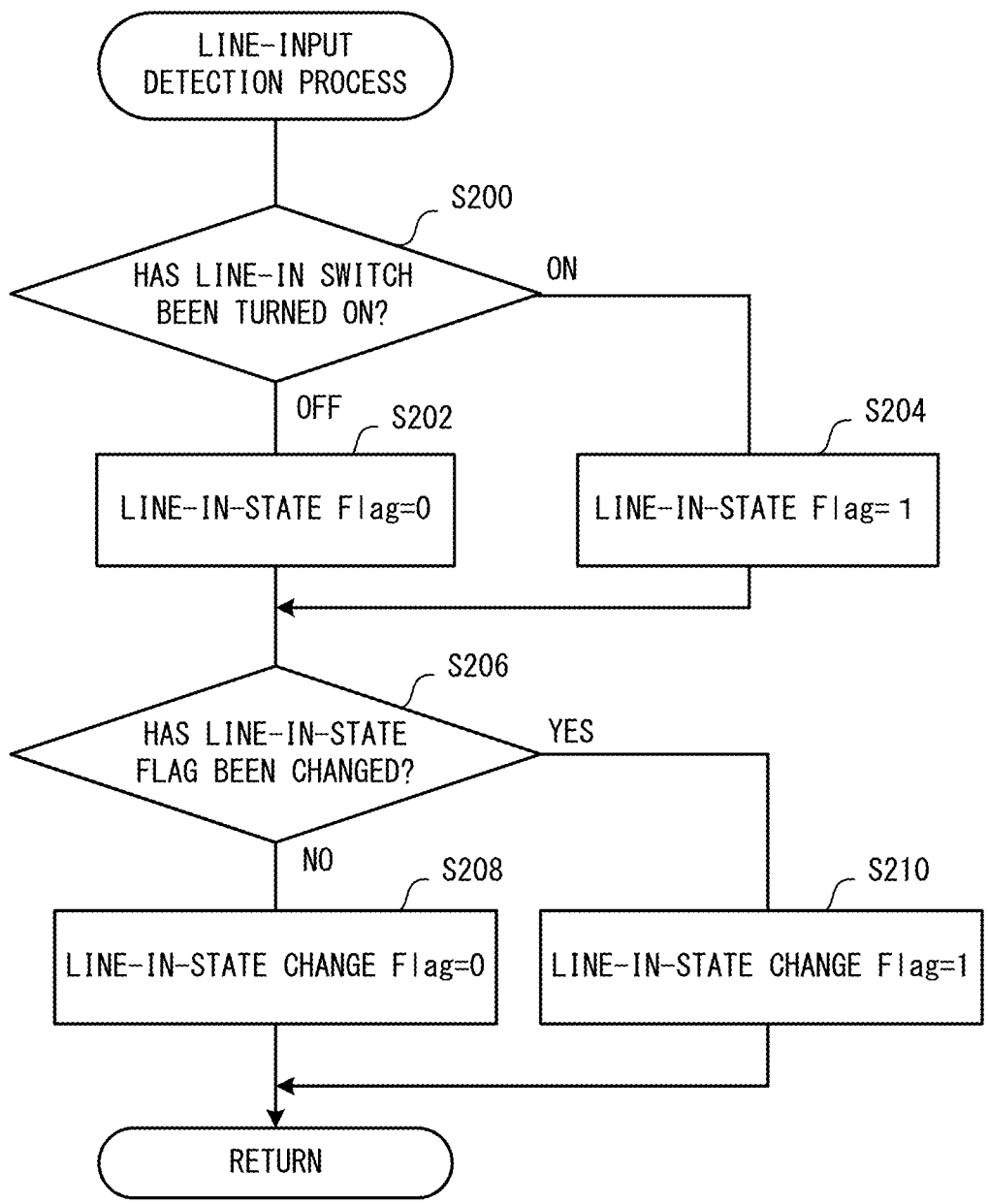
FIG. 7 illustrates a subroutine of a line-in-input detection process.

Next, descriptions will be given of the line-in-input detection process in step S20. FIG. 7 illustrates a subroutine of the line-in-input detection process. The system controller 230 determines whether a line-in switch of the line-in input 125 has been turned on (step S200). The line-in switch is turned on when a cable of an external microphone or IC recorder 300 has been mounted on a terminal of the line-in input 125.

Upon determining that the line-in switch has been turned off (OFF in step S200), the system controller 230 sets line-in-state flag=0 (step S202). Upon determining that the line-in switch has been turned on (ON in step S200), the system controller 230 sets line-in-state flag=1 (step S204).

By making a comparison with a previous line-in-input detection result, the system controller 230 determines whether the line-in-state flag has been changed (step S206). Upon determining that the line-in-state flag has not been changed (NO in step S206), the system controller 230 sets line-in-state change flag=0 (step S208).

Upon determining that the line-in-state flag has been changed (YES in step S206), the system controller 230 sets hot-shoe-state change flag=1 (step S210). Finally, the line-in-input detection process is finished, and the flow shifts to step S30 in FIG. 5.

Next, descriptions will be given of the IC-recorder mounting process in step S30. The IC-recorder mounting process is a process of making camera settings for an IC recorder 300 after the mounting of the IC recorder 300 has been detected.

Figure 8:
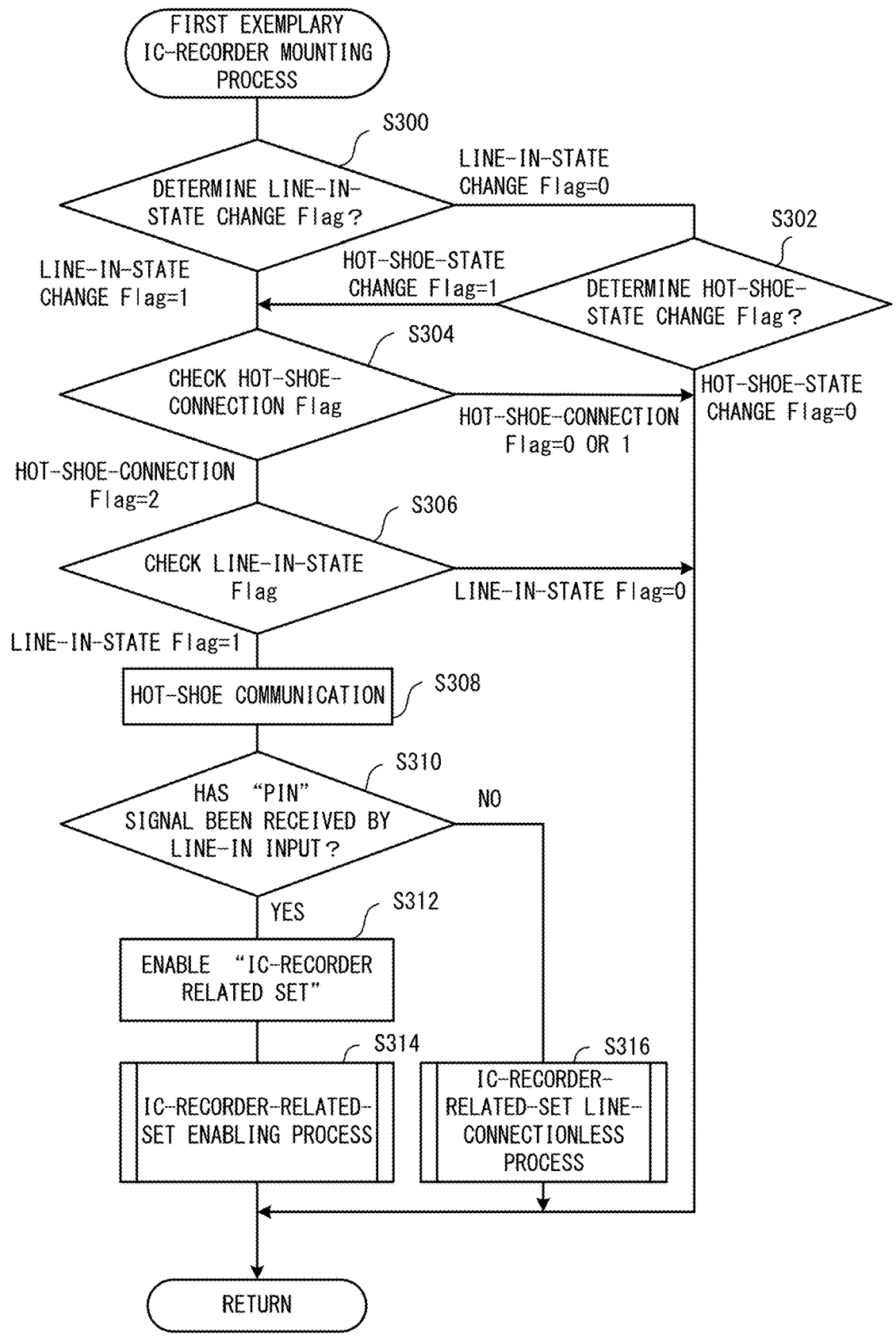
FIG. 8 illustrates a subroutine of a first exemplary IC-recorder mounting process.

Two examples will be described herein for the IC-recorder mounting process. FIG. 8 illustrates a subroutine of a first exemplary IC-recorder mounting process. The system controller 101 determines a line-in-state change flag (step S300).

Upon determining that line-in-state change flag=0 has been satisfied, the system controller 101 determines a hot-shoe-state change flag (step S302). Upon determining that hot-shoe-state change flag=0 has been satisfied, the system controller 101 ends this process and shifts to step S40 in FIG. 5. Upon determining that hot-shoe-state change flag=1 has been satisfied, the system controller 101 shifts to step S304.

Upon determining that line-in-state change flag=1 has been satisfied, the system controller 101 checks a hot-shoe-connection flag (step S304). Upon determining that hot-shoe-connection flag=0 or 1 has been satisfied, the system controller 101 ends this process and shifts to step S40 in FIG. 5. As described above, hot-shoe-connection flag=0 indicates that nothing has been mounted on the hot shoe 130, and hot-shoe-connection flag=1 indicates that an external flash has been mounted on the hot shoe 130.

Upon determining that hot-shoe-connection flag=2 has been satisfied, the system controller 101 checks the line-in-state flag (step S306). As described above, hot-shoe-connection flag=2 indicates that an IC recorder 300 has been mounted on the hot shoe 130. Upon determining that line-in-state flag=0 has been satisfied, the system controller 101 ends this process and shifts to step S40. In this situation, an IC recorder 300 has been mounted on the hot shoe 130, but nothing has been connected to the line-in input 125.

Upon determining that line-in-state flag=1 has been satisfied, the system controller 101 performs a hot-shoe communication (step S308). The system controller 230 communicates with the IC recorder 300 mounted on the hot shoe 130 via the external-device controller 131.

In particular, the system controller 230 makes a request for the IC recorder 300 to output a predetermined "pin" signal from the line output 310. A "pin" signal is an authentication signal for allowing the system controller 230 to set an IC-recorder related set in response to the camera 10 detecting that the line output 310 of the IC recorder 300 has been connected to the line-in input 125 of the camera 10. An authentication signal has a certain frequency, amplitude, and waveform for allowing authentication. FIG. 2A indicates for convenience sake that the line output 310 and the line-in input 125 are connected. However, the line output 310 is supposed to be connected to the line-in input 125 by the user as suggested in FIG. 1, and hence the IC recorder 300 is not always connected to the camera 10.

The authentication signal is not limited to a signal for setting an IC-recorder related set corresponding to an authenticated IC recorder 300. In addition, a calibration function for making optimum settings for the signal may be provided to generate an IC-recorder related set.

The system controller 101 determines, by means of the external-device detector 101b, whether a "pin" signal has been received by the line-in input 125 (step S310).

Upon determining that a "pin" signal has been received by the line-in input 125 (YES in step S310), the system controller 101 enables an "IC-recorder related set" (step S312). In this case, the system controller 101 sets IC-recorder line-in-connection flag=1.

The system controller 230 performs an IC-recorder-related-set enabling process (step S314). The "IC-recorder-related-set enabling process" is a process of enabling an "IC-recorder related set", i.e., a camera set assumed to use the IC recorder 300. Enabling or disabling can be manually set using a menu, and hence an IC recorder 300 that is not adapted to the "pin"-signal-based automatic detection system can also be addressed.

Figure 9:
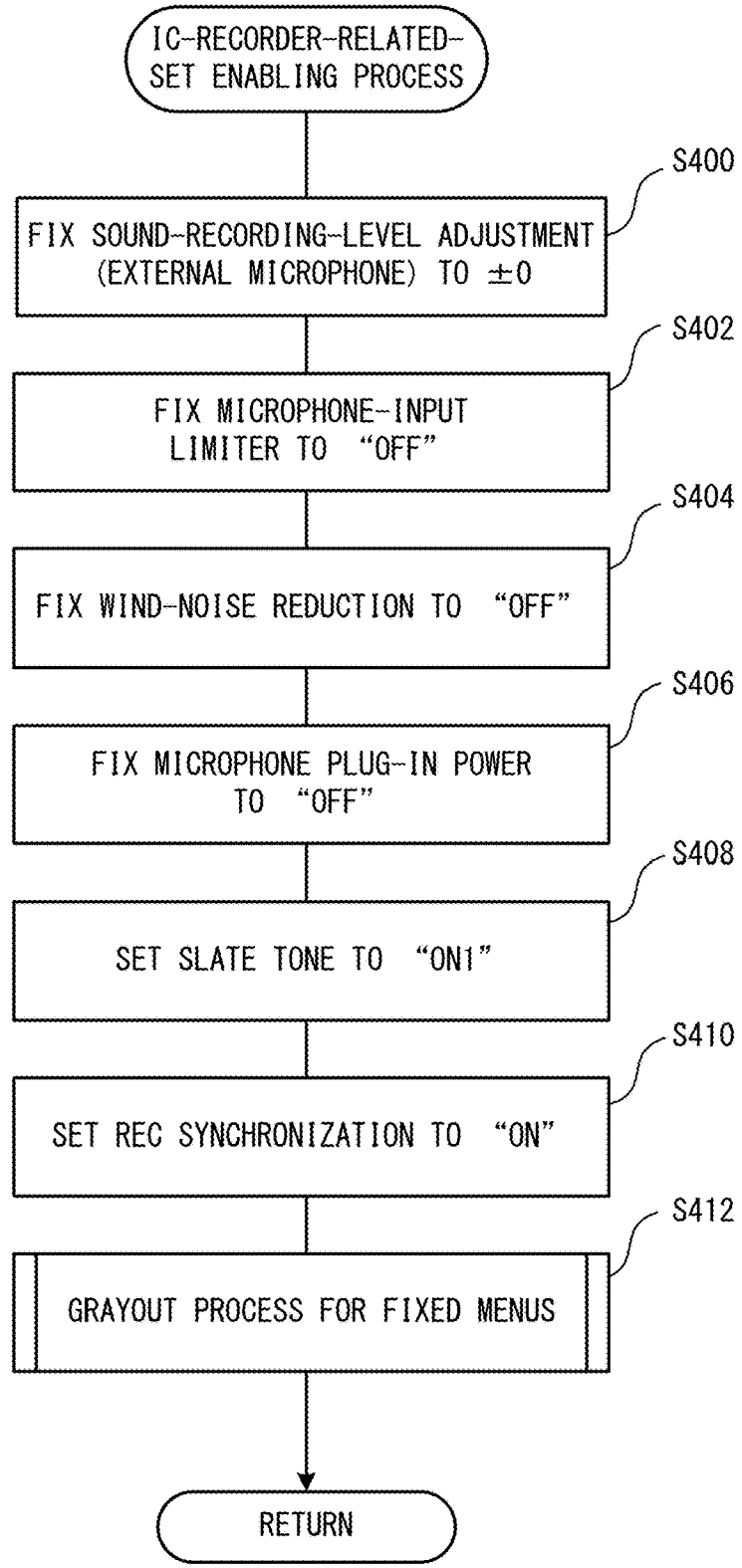
FIG. 9 illustrates a subroutine of an IC-recorder-related-set enabling process.

FIG. 9 illustrates a subroutine of the IC-recorder-related-set enabling process. The setting controller 101c sets, for the IC recorder 300, the sound-recording conditions described in the following. This is because these conditions are appropriately set on the IC-recorder-300 side. As described above, the setting controller 101c may make the settings described in the following by reading a sound-recording-apparatus setting set from the nonvolatile memory 122.

The setting controller 101c fixes sound-recording-level adjustment (external microphone) to "±0" (step S400). The setting controller 101c fixes microphone-input limiter to "Off" (step S402). The setting controller 101c fixes wind-noise reduction to "Off" (step S404). Accordingly, a sound-recording level, a sound-recording limiting function for preventing cracking of recorded sounds, and wind-noise reduction function are addressed entirely on the IC-recorder-300 side. Meanwhile, the setting controller 101c recognizes that the IC recorder 300 has been connected to the line-in input 125 and thus determines that power does not need to be supplied to an external microphone, thereby fixing microphone plug-in power to "Off" (step S406). Settings cannot be changed for fixed menus.

The setting controller 101c sets slate tone to "On1" (step S408). The setting controller 101c sets REC synchronization to "On" (step S410). The setting controller 101c performs a grayout process for fixed menus (step S412). Settings can be changed for slate tone and REC synchronization. The processes of steps S400-S410 may be performed in any order. As described above, settings that can be useful to any user or any image-shooting scene are grayed out to prevent the user from accidentally making a change to the settings. Other settings may be defined as recommended settings to which the user can make a change, as appropriate.

Figure 10:
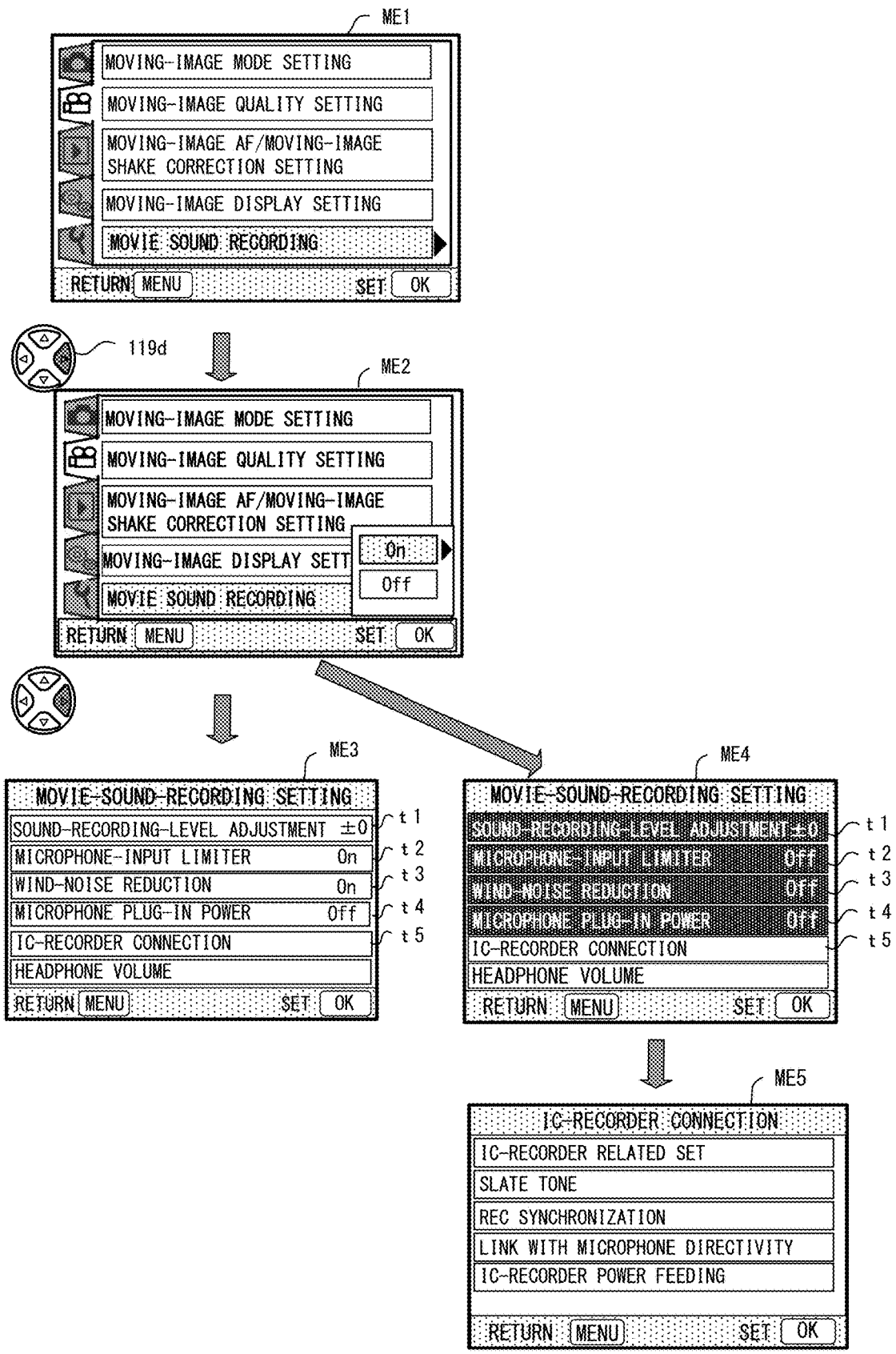

FIG. 10 illustrates examples of menu screens that have undergone a grayout process or the like. A menu ME1 depicted in FIG. 10 is a movie menu selected on a main menu screen. When the movie sound recording on the lowest line has been selected on menu ME1, clicking a right button of the D-pad 119d will switch the menu to menu ME2.

Menu ME2 is such that selecting "On" triggers a setting for providing a movie file with sounds and selecting "Off" triggers a setting for providing a movie file with no sounds. Clicking the right button while "On" is selected on menu ME2 switches the screen to one for setting details of "movie-sound-recording setting".

Menu ME3 is a movie-sound-recording setting screen in an ordinary situation (e.g., while the built-in microphone is used). Menu ME4, which is a sound-recording setting screen provided when the IC recorder 300 is connected to the camera, is a screen that has undergone the above-described grayout process. As indicated in menu ME4, a "sound-recording-level adjustment" menu t1, a "microphone-input limiter" menu t2, a "wind-noise reduction" menu t3, and a "microphone plug-in power" menu t4 are grayed out.

Selecting IC-recorder connection t5 on menu ME4 switches the screen to menu ME5, which is a menu screen for IC-recorder connection. Menu ME5 is such that the setting controller 101c sets a "slate tone" menu t11 and a "REC synchronization" menu t12 to On1 and On, respectively. Settings can be changed for "slate tone" and "REC synchronization", and hence neither the "slate tone" menu t11 nor the "REC synchronization" menu t12 undergoes the grayout process.

A "link-with-microphone-directivity" menu t13 of menu ME5 allows a setting to be made as to whether to link the field of view of the camera 10 with the microphone directivity. The link with microphone directivity will be described hereinafter by referring to, for example, FIG. 19. An "IC-recorder power feeding" menu t14 allows a setting to be made as to whether to feed power from the camera 10 to the IC recorder 300. The IC-recorder power feeding will be described hereinafter by referring to FIG. 17.

Figure 11:
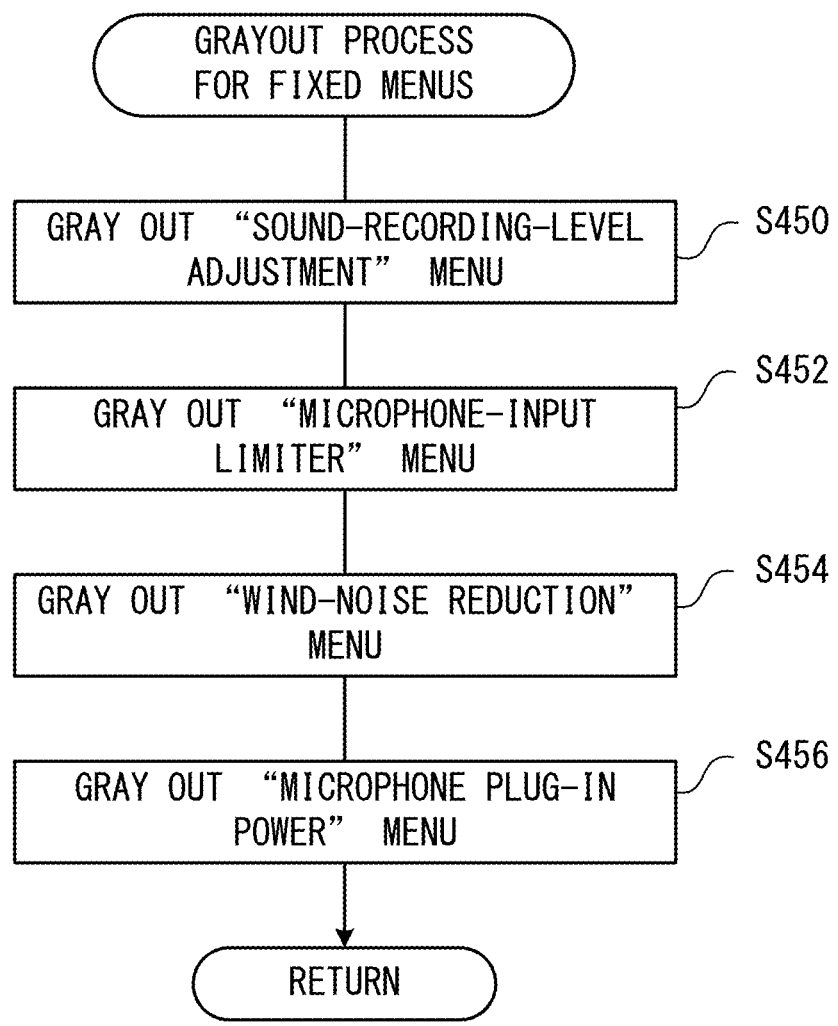
FIG. 11 illustrates a subroutine of a grayout process.

FIG. 11 illustrates a subroutine of the grayout process. The setting controller 101c grays out the "sound-recording-level adjustment" menu t1 (step S450). The setting controller 101c grays out the "microphone-input limiter" menu t2 (step S452). The setting controller 101c grays out the "wind-noise reduction" menu t3 (step S454). The setting controller 101c grays out the "microphone plug-in power" menu t4 (step S456). The processes of steps S450-S456 may be performed in any order.

Next, the flow returns to S310 in FIG. 8. Upon determining that a "pin" signal has not been received by the line-in input 125 (NO in step S310), the system controller 230 performs an "IC-recorder-related-set" line-connectionless process (step S316). In this situation, the IC recorder 300 is mounted on the hot shoe 130, and an external microphone is connected to the line-in. Accordingly, the system controller 101 sets IC-recorder line-in-connection flag=0.

Figure 12:
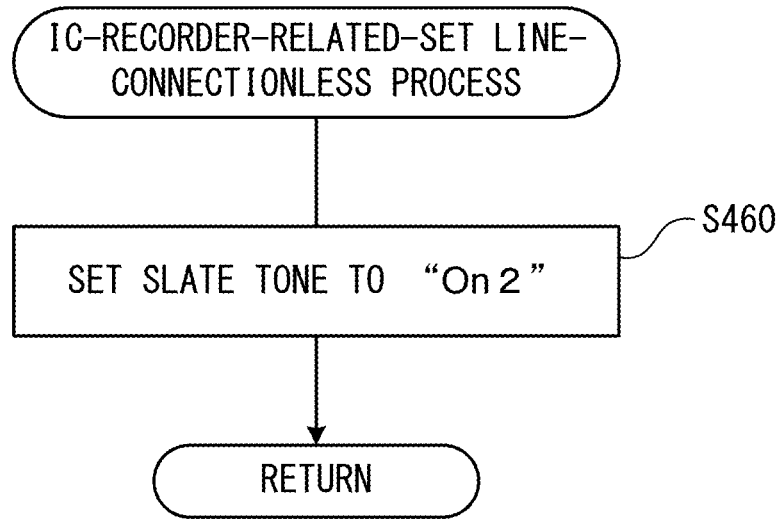
FIG. 12 illustrates a subroutine of an "IC-recorder-related-set" line-connectionless process.

FIG. 12 illustrates a subroutine of the "IC-recorder-related-set" line-connectionless process. The system controller 230 sets slate tone to "On2" (step S460). Descriptions will be given of the slate tone "On2" hereinafter by referring to FIG. 25.

Next, a second exemplary IC-recorder mounting process will be described. The first exemplary IC-recorder mounting process is such that when the IC recorder 300 has been mounted on the hot shoe 130, it is checked using a pin signal whether the IC recorder 300 has also been connected to the line-in input 125. By contrast, the second exemplary IC-recorder mounting process is such that when the IC recorder 300 has been mounted on the hot shoe 130, a process that is a simplified version of the first exemplary IC-recorder mounting process is performed on the assumption that the IC recorder 300 has been connected to the line-in input 125.

Figure 13:
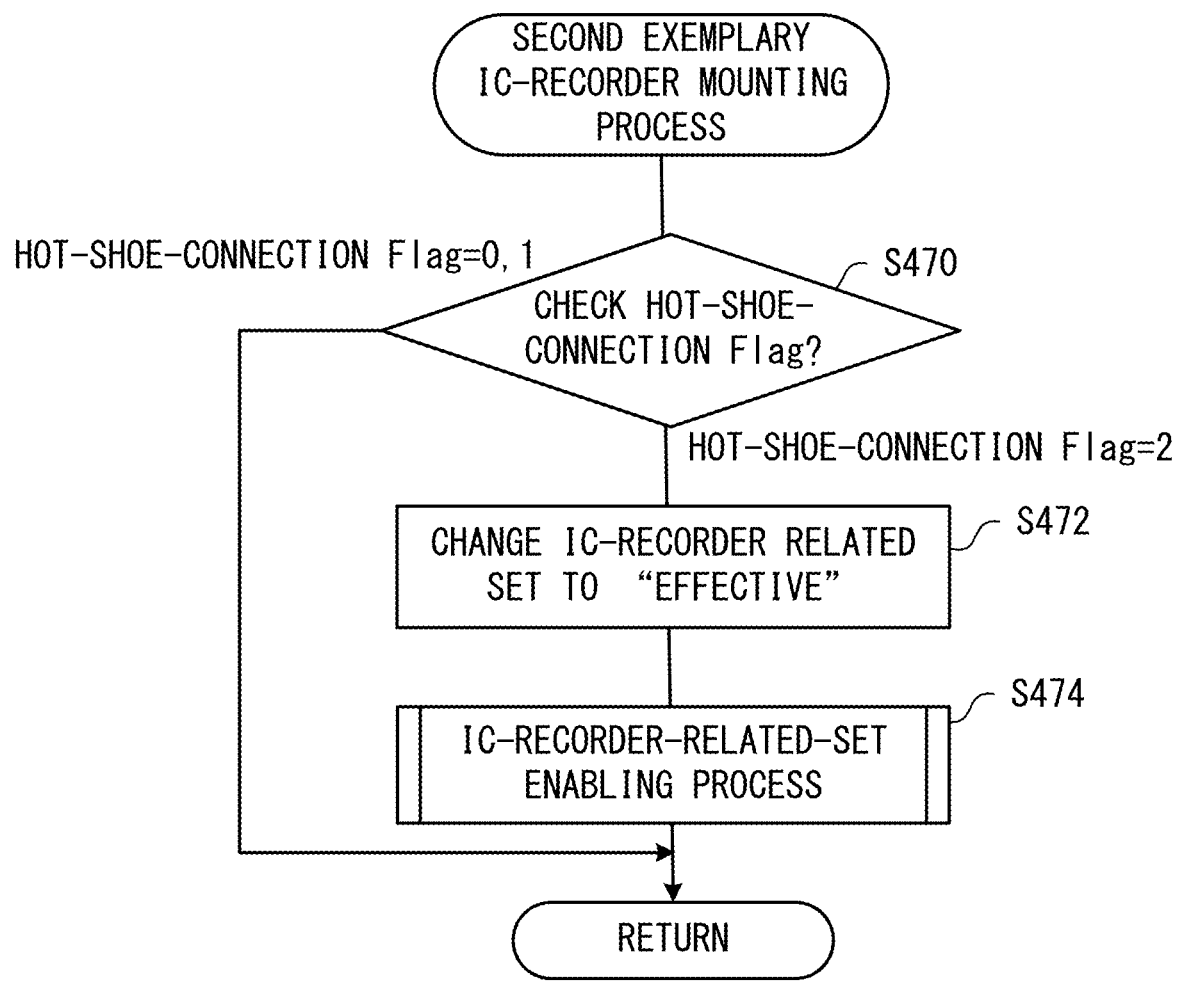
FIG. 13 illustrates a subroutine of a second exemplary IC-recorder mounting process.

FIG. 13 illustrates a subroutine of the second exemplary IC-recorder mounting process. The system controller 101 checks a hot-shoe-connection flag (step S470). When the system controller 101 determines that hot-shoe-connection flag=0 or 1 has been satisfied, the system controller 101 ends this process. When the system controller 101 determines that hot-shoe-connection flag=2 has been satisfied, the system controller 101 changes the IC-recorder related set to "effective" (step S472) and performs the IC-recorder-related-set enabling process (step S474). The IC-recorder-related-set enabling process has already been described above by referring to FIG. 9. A table depicted in FIG. 14 indicates the flags described above by referring to FIGS. 6-8

FIG. 5 should be referred to again. After the IC-recorder mounting process is performed in step S30, the system controller 101 performs a live-view display process (step S40).

Figure 15:
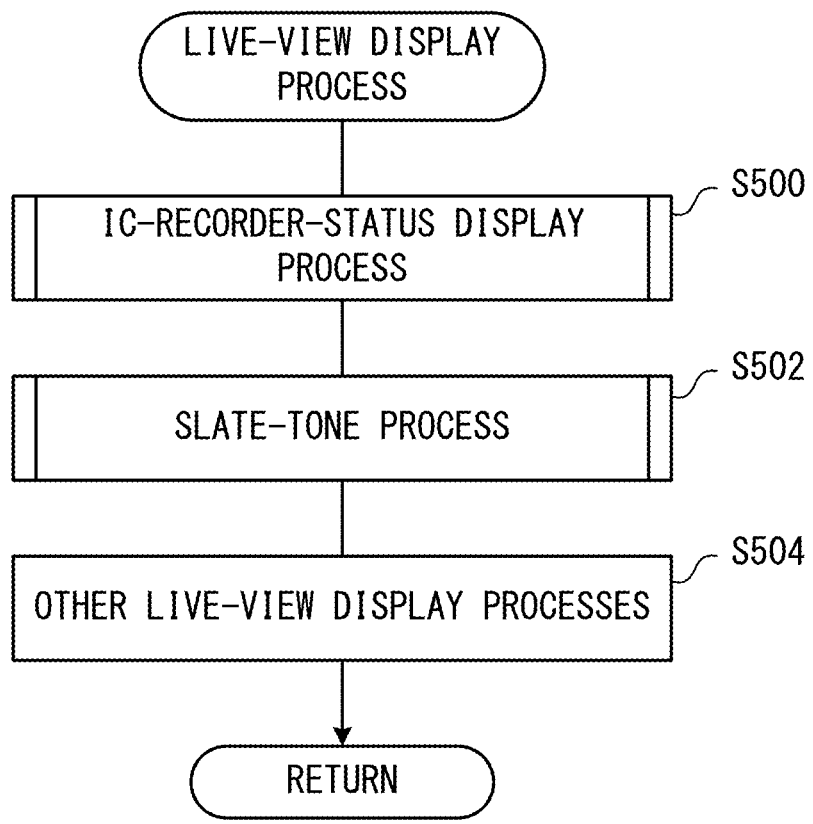
FIG. 15 illustrates a subroutine of a live-view display process.

FIG. 15 illustrates a subroutine of the live-view display process. The system controller 101 performs an IC-recorder-status display process (step S500).

Figure 16A:
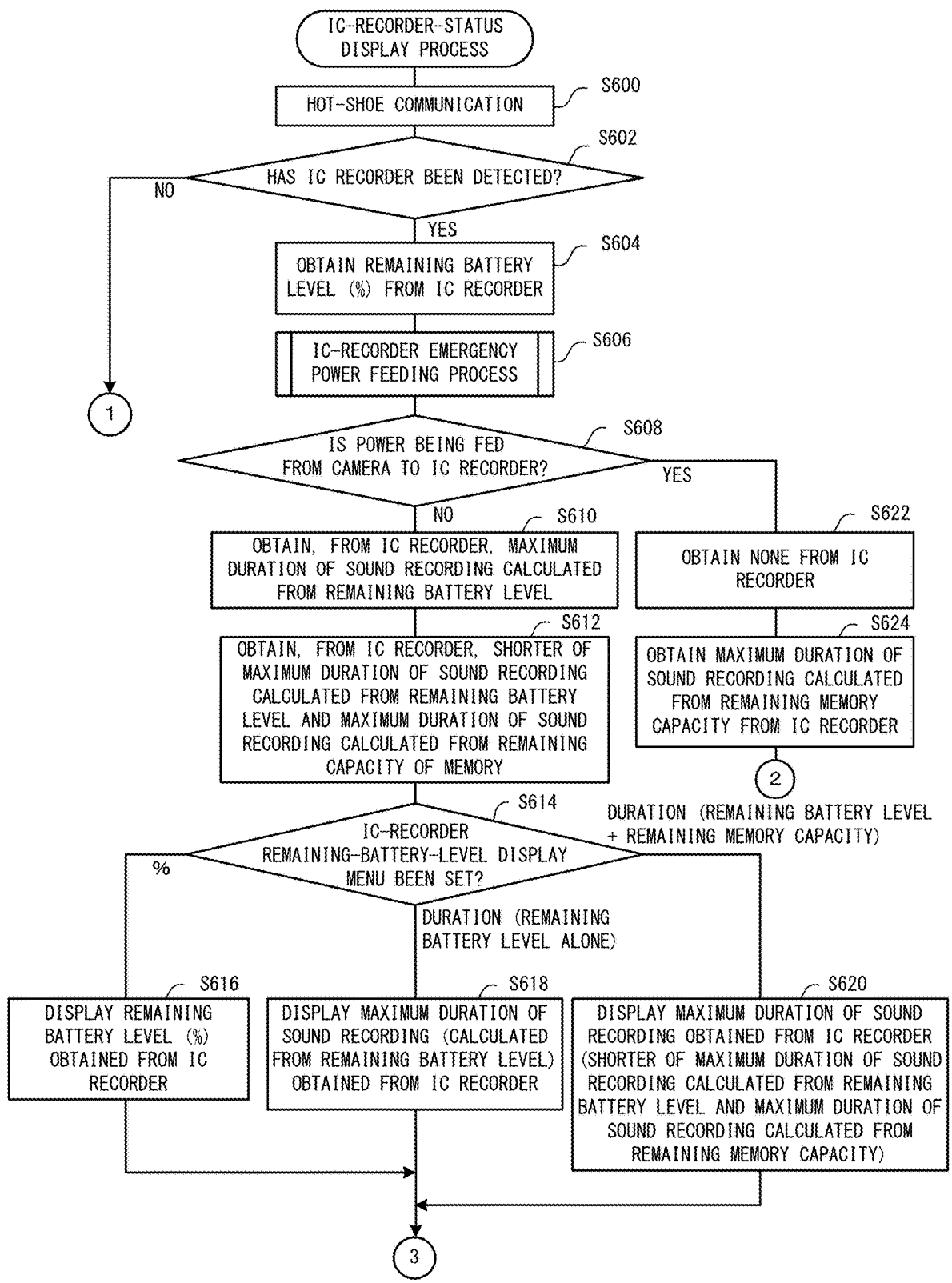
FIG. 16A illustrates a subroutine of an IC-recorder-status display process.
Figure 16B:
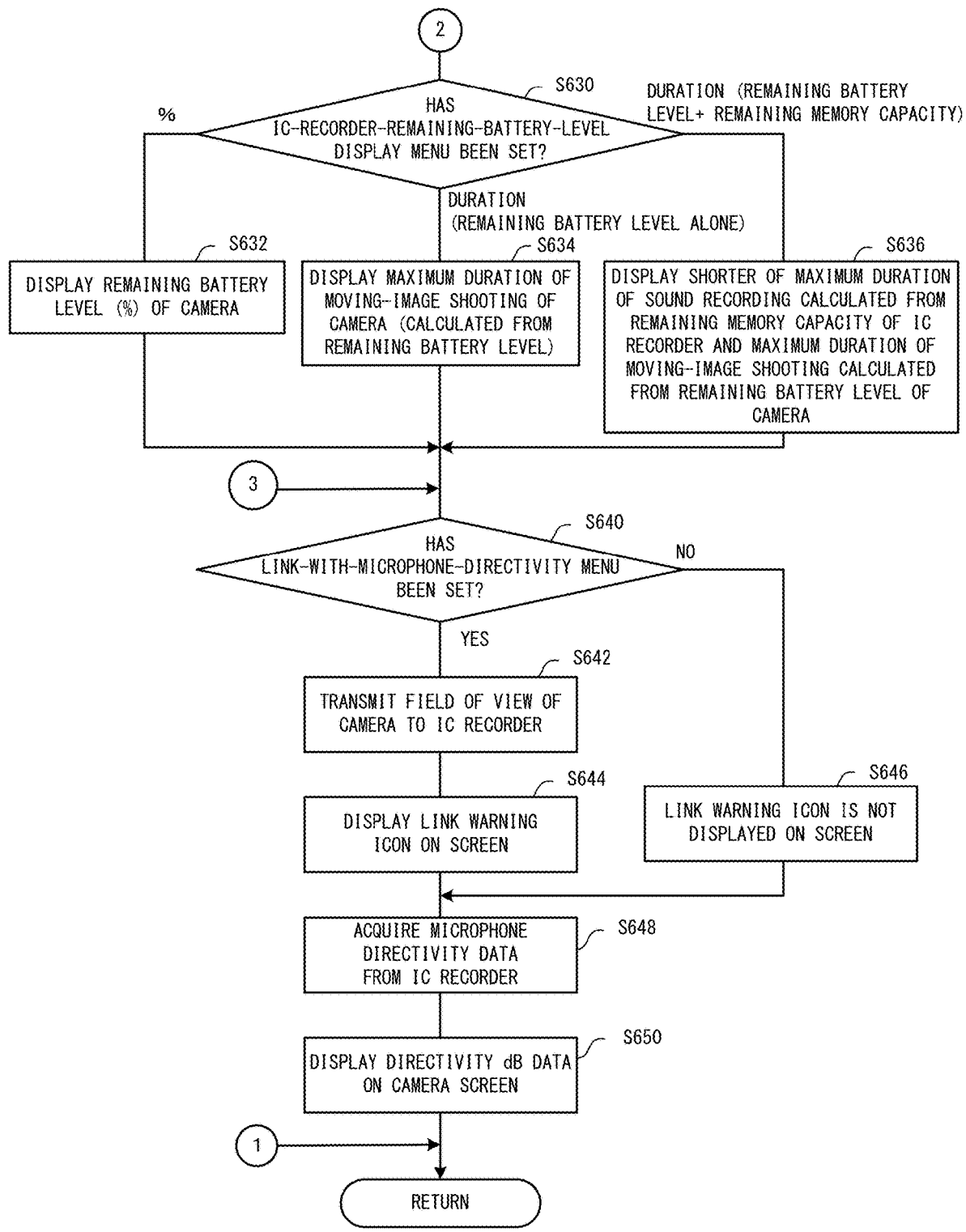
FIG. 16B illustrates a subroutine of an IC-recorder-status display process.

FIGS. 16A and 16B illustrate subroutines of the IC-recorder-status display process. In the process described in the following, the system controller 101 transmits data to the IC recorder 300 via the TXD terminal 130b of the hot shoe 130 and receives data from the IC recorder 300 via the RXD terminal 130c of the hot shoe 130. The system controller 101 also feeds power to the IC recorder 300 via the PWS terminal 130d on an as-needed basis.

The external-device detector 101b performs a hot-shoe communication via the external-device controller 131 (step S600). The system controller 101 determines by means of the external-device detector 101b whether the IC recorder 300 has been detected as an external device (step S602). Upon determining that the IC recorder 300 has not been detected as an external device (NO in step S602), the system controller 101 ends the IC-recorder-status display process.

Upon determining that the IC recorder 300 has been detected as an external device (YES in step S602), the system controller 101 obtains a remaining battery level (%) of the IC recorder 300 from the IC recorder 300 (step S604). The remaining battery level (%) transmitted from the IC recorder 300 is information displayed on a display (not illustrated) of the IC recorder 300.

Figure 17:
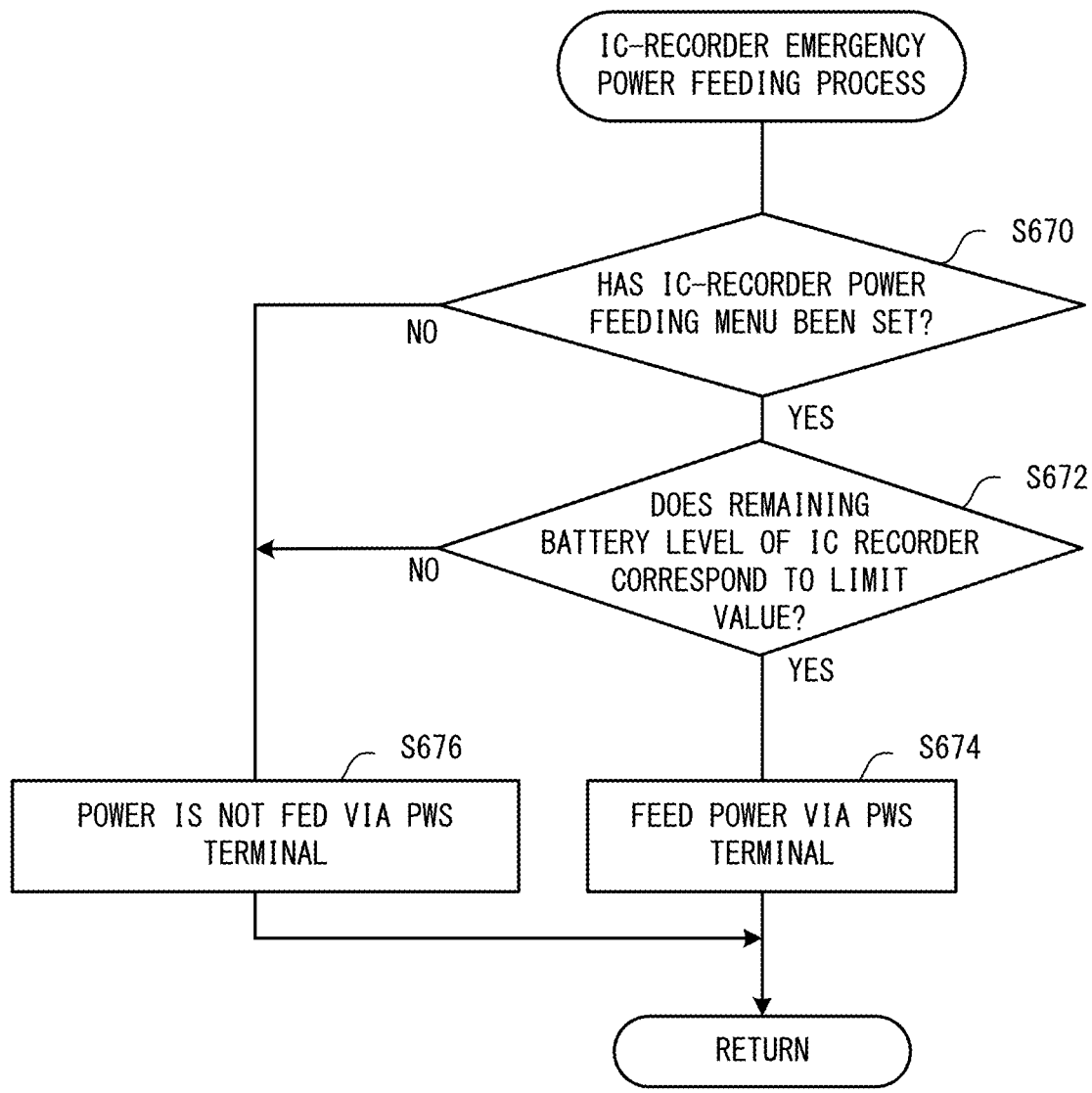
FIG. 17 is a subroutine of an IC-recorder emergency power feeding process.

The system controller 101 performs an IC-recorder emergency power feeding process (step S606). FIG. 17 is a subroutine of the IC-recorder emergency power feeding process. The system controller 101 determines whether an IC-recorder power feeding menu has been set (step S670). Power is enabled to be fed to, or is disabled from being fed to, the IC recorder by using the "IC-recorder power feeding" menu t14 of the above-described menu ME5 depicted in FIG. 10.

Upon determining that IC-recorder power feeding has been set (YES in step S670), the system controller 101 determines in accordance with the obtained remaining battery level (%) whether the remaining battery level of the IC recorder 300 corresponds to a limit value (step S672). The limit value is, for example, a remaining battery level of 10% or lower. Upon determining that the remaining battery level of the IC recorder 300 is the limit value (YES in step S672), the system controller 101 feeds power via the PWS terminal 130d of the hot shoe 130 (step S674). In particular, the power-supply controller 118 feeds power to the IC recorder 300.

Upon determining that the IC-recorder power feeding menu has not been set (Off) (NO in step S670), the system controller 101 does not feed power to the IC recorder 300 via the PWS terminal 130d (step S676). Similarly, upon determining that the remaining battery level of the IC recorder 300 is not the limit value (NO in step S672), the system controller 101 does not feed power to the IC recorder 300 via the PWS terminal 130d (step S676).

FIG. 16A should be referred to again. The system controller 101 determines whether power is being fed from the camera 10 to the IC recorder 300 (step S608). When power is not being fed from the camera 10 to the IC recorder 300 (NO in step S608), the system controller 101 instructs the IC recorder 300 to transmit a maximum duration of sound recording calculated from the remaining battery level (which may hereinafter be referred to as a first maximum duration of sound recording) to the camera. The system controller 101 obtains the maximum duration of sound recording calculated from the remaining battery level from the IC recorder 300 (step S610).

The system controller 101 instructs the IC recorder 300 to transmit, to the camera 10, the shorter of the maximum duration of sound recording calculated from the remaining battery level and a maximum duration of sound recording calculated from a remaining capacity of the memory (external memory 308) (this shorter maximum duration may hereinafter be referred to as a second maximum duration of sound recording). The system controller 101 obtains the shorter maximum duration of sound recording (second maximum duration of sound recording) from the IC recorder 300 (step S612).

The displaying-of-remaining-battery-level controller 101d displays the IC-recorder remaining battery level in accordance with the setting of an IC-recorder remaining-battery-level display menu (step S614).

The displaying-of-remaining-battery-level controller 101d displays the remaining battery level (%) obtained from the IC recorder 300 (step S616), the maximum duration of sound recording calculated from the remaining battery level obtained from the IC recorder 300 (step S618), or the maximum duration of sound recording obtained from the IC recorder 300 (the shorter of the maximum duration of sound recording calculated from the remaining battery level and the maximum duration of sound recording calculated from the remaining capacity of the memory) (step S620).

Upon determining that power is being fed from the camera 10 to the IC recorder 300 (YES in step S608), the system controller 101 instructs the IC recorder 300 to transmit "NONE" to the camera as a maximum duration of sound recording. The system controller 101 obtains "NONE" from the IC recorder 300 (step S622).

In addition, the system controller 101 instructs the IC recorder 300 to transmit a maximum duration of sound recording calculated from the remaining capacity of the memory (external memory 308) to the camera. The system controller 101 obtains, from the IC recorder 300, the maximum duration of sound recording calculated from the remaining capacity of the memory (step S624). Then, the flow shifts to the processes depicted in FIG. 16B.

The displaying-of-remaining-battery-level controller 101d performs the displaying process described in the following in accordance with the setting of the IC-recorder remaining-battery-level display menu (step S630). The power consumption of the camera 10 is much larger than that of the IC recorder 300, and hence the power consumption (%) of the camera 10 and the IC recorder 300 while power is being fed to the IC recorder 300 can be deemed as the power consumption (%) of the camera 10 alone. Similarly, the maximum duration of moving-image shooting calculated from the remaining battery level of the camera 10 and the IC recorder 300 can be deemed as a maximum duration of moving-image shooting calculated from the remaining battery level of the camera 10 alone.

The displaying-of-remaining-battery-level controller 101d displays the remaining battery level (%) of the camera 10 (step S632), the maximum duration of moving-image shooting of the camera 10 (calculated from the remaining battery level) (step S634), or the shorter of the maximum duration of sound recording calculated from the remaining memory capacity of the IC recorder 300 and the maximum duration of moving-image shooting calculated from the remaining battery level of the camera 10 (step S636).

Figure 18:
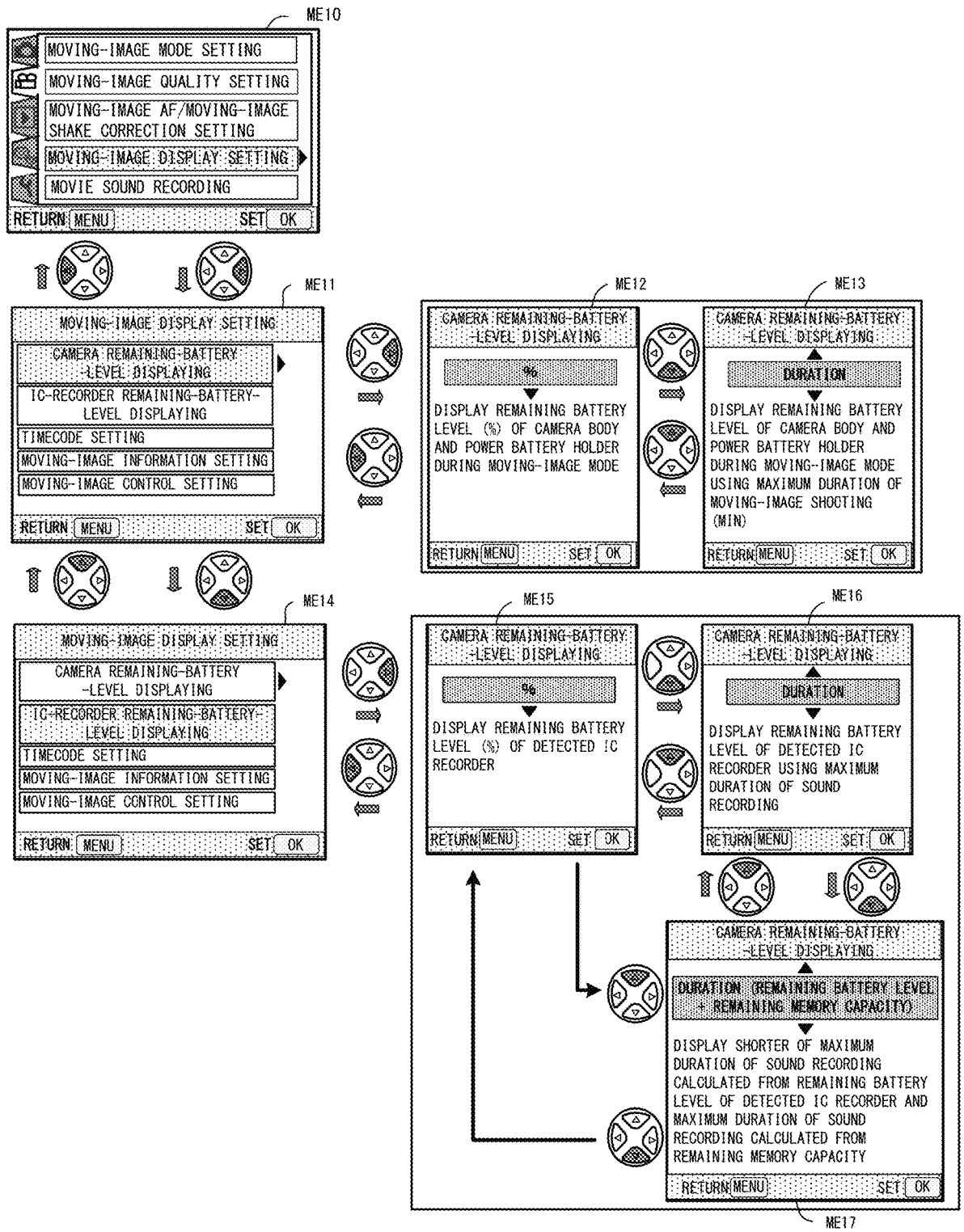
FIG. 18 illustrates examples of remaining-battery-level display menus.

FIG. 18 illustrates examples of the remaining-battery-level display menus. In particular, FIG. 18 indicates examples of the remaining-battery-level display menus provided when power is not fed from the camera 10 to the IC recorder 300. The remaining-battery-level display menus provided when power is fed from the camera 10 to the IC recorder 300 are essentially the same as the menus depicted in FIG. 18 and thus are not illustrated in the figures.

Menu ME10 is the same as the menu ME1 depicted in FIG. 10. Clicking the right button with a moving-image display setting selected within menu ME10 shifts the screen to menu ME11. Clicking the right button with camera remaining-battery-level displaying selected within menu ME11 shifts the screen to one for making settings to display a remaining battery level (%) (menu ME12). Clicking the OK button 119e with menu ME12 displayed causes the remaining battery level to be displayed in percentage. Note that this example is based on the assumption that a power battery holder has been mounted on the camera 10.

Clicking the down button while menu ME12 is displayed shifts the screen to one for making settings to display a maximum duration of moving-image shooting calculated from a remaining battery level (menu ME13). The maximum duration of moving-image shooting is calculated from the total remaining battery level of the camera and the power battery holder.

Clicking the down button with IC-recorder remaining-battery-level displaying selected within menu ME11 shifts the screen to menu ME14. Clicking the right button while menu ME14 is displayed shifts the screen to one for making settings to display the remaining battery level of a detected IC recorder 300 in percentage (menu ME15). This is the displaying of the remaining battery level (%) described with reference to step S616.

Pressing the down button while menu ME15 is displayed shifts the screen to one for making settings to display the maximum duration of sound recording calculated from the remaining battery level of the IC recorder (menu ME16). In particular, menu ME16 is such that the displaying of the first maximum duration of sound recording described above with reference to step S618 is set as the displaying of the remaining battery level of the IC recorder.

Clicking the down button while menu ME16 is displayed or clicking the up button while menu ME15 is displayed causes the shorter of the maximum duration of sound recording calculated from the remaining battery level of the detected IC recorder and the maximum duration of sound recording calculated from the remaining memory capacity to be displayed (menu ME17). In particular, menu ME17 is such that the displaying of the second maximum duration of sound recording described above with reference to step S620 is set as the displaying of the remaining battery level of the IC recorder.

Next, descriptions will be given by referring to FIG. 16B again. The system controller 101 determines whether a link-with-microphone-directivity menu has been set (step S640). The link-with-microphone-directivity menu is a menu for making settings as to whether to link the directivity of the IC recorder 300 with the field of view of the camera 10. Details of the link-with-microphone-directivity menu will be described hereinafter by referring to FIG. 31B.

Upon determining that the link-with-microphone-directivity menu has not been set (NO in step S640), the system controller 101 does not display a link warning icon on the screen of the display 120 (step S646) and shifts to step S648.

Upon determining that the link-with-microphone-directivity menu has been set (YES in step S640), the system controller 101 transmits the field of view of the camera 10 from the hot shoe 130 to the IC recorder 300 (step S642). Meanwhile, the system controller 101 displays the link warning icon on the screen of the display 120 (step S644). The link warning icon will be described hereinafter by referring to FIG. 19.

When a link-with-microphone-directivity instruction and the field of view are received from the camera 10, the system controller 301 of the IC recorder 300 sets a microphone directivity that depends on the field of view. The system controller 301 of the IC recorder 300 transmits microphone directivity data to the camera 10 via the hot shoe 130. The system controller 101 acquires the microphone directivity data from the IC recorder 300 (step S648). The system controller 101 displays directivity dB data on the screen of the display 120 (step S650).

Figure 19:
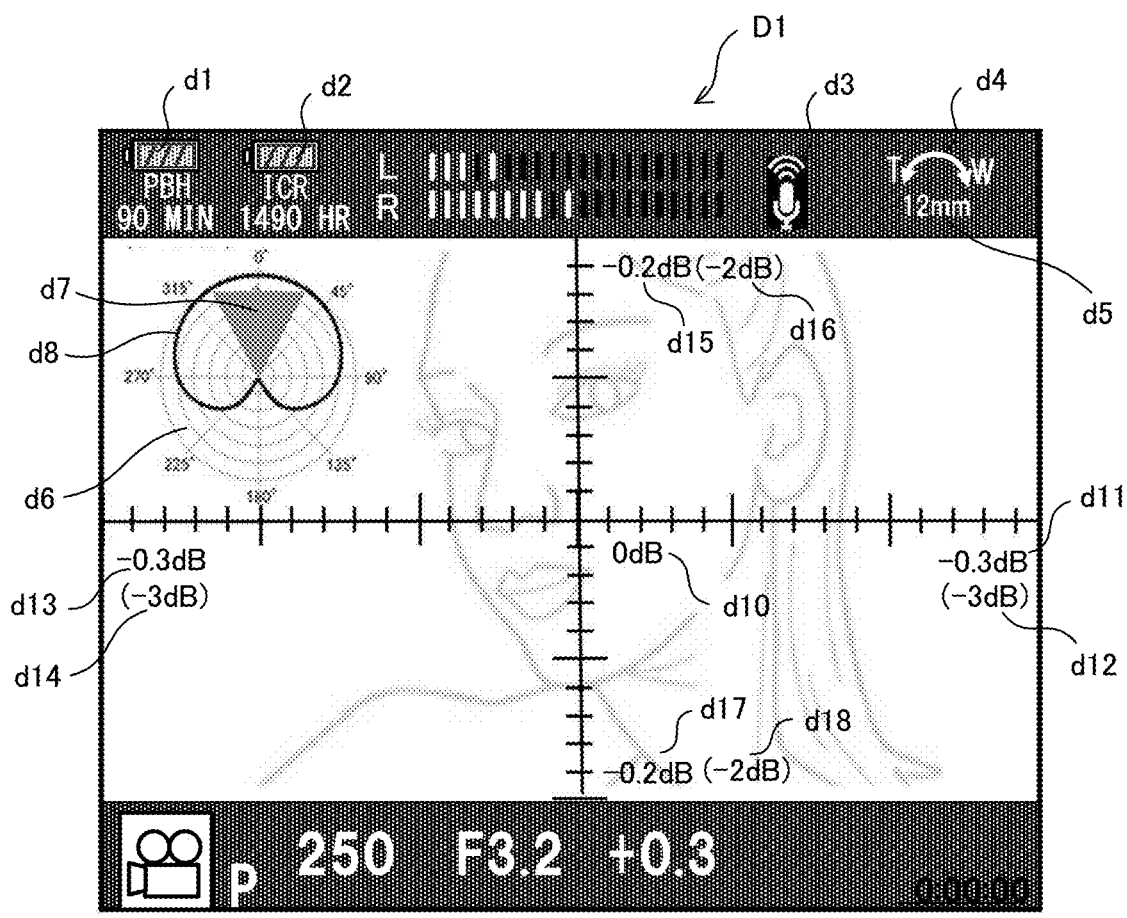
FIG. 19 illustrates an example of a live-view image displayed on a display.

FIG. 19 illustrates an example of a live-view image Dl displayed on the display 120. The live-view image indicates at least one of a remaining battery level, a maximum duration of sound recording, and microphone directivity information as status information of the IC recorder 300. Camera-battery information d1 and IC-recorder battery information d2 are indicated on an upper-left portion of live-view image Dl. The camera battery information d1 depicted in FIG. 19 indicates that the maximum duration of moving-image shooting based on the remaining battery level is 90 minutes under a condition in which a power battery holder is mounted. Camera-battery information d1 and IC-recorder battery information d2 are displayed under the control of the displaying-of-remaining-battery-level controller 101d.

When power is not being fed to the IC recorder 300, a "maximum duration of moving-image shooting based on remaining battery level" associated with the camera 10 alone or "remaining battery level (%)" is selected on the remaining-battery-level display menu and displayed as camera battery information d1. The system controller 101 calculates the "maximum duration of moving-image shooting based on remaining battery level" or the "remaining battery level (%)" from the remaining battery level of the power supply 117 (including the power battery holder) detected by the power-supply controller 118.

As described above with reference to FIG. 16A, when power is not being fed to the IC recorder 300, the "remaining battery level (%)", the "maximum duration of sound recording calculated from the remaining battery level", or the "shorter of the maximum duration of sound recording calculated from the remaining battery level and the maximum duration of sound recording calculated from the remaining capacity of the memory" is displayed as IC-recorder battery information d2. The IC-recorder battery information d2 depicted in FIG. 19 indicates that the maximum duration of moving-image shooting that can be performed with the IC recorder 300 is 1490 hours.

When power is being fed to the IC recorder 300, the "remaining battery level (%)" or "maximum duration of moving-image shooting calculated from the remaining battery level" of the entirety of the imaging system 1 (camera 10 and IC recorder 300) is displayed as camera battery information d1. The system controller 101 calculates the "remaining battery level (%)" and the "maximum duration of moving-image shooting based on the remaining battery level" from the remaining battery level of the power supply 117 (including the power battery holder) detected by the power-supply controller 118.

As described above with reference to FIG. 16B, when power is being fed to the IC recorder 300, the power supply of the camera 10 is primarily relied on. Accordingly, the "remaining battery level (%)" of the camera 10, the "maximum duration of moving-image shooting calculated from the remaining battery level" of the camera 10, or the "shorter of the maximum duration of sound recording calculated based on the remaining memory capacity of the IC recorder 300 and the maximum duration of moving-image shooting based on the remaining battery level of the camera 10" is displayed as IC-recorder battery information d2. When power is being fed to the IC recorder 300, camera battery information d1 is the same as IC-recorder battery information d2.

The system controller 101 calculates a "maximum duration of moving-image shooting based on remaining battery level" and a "remaining battery level (%)" for "camera 10+IC recorder 300" on the basis of the remaining battery level of the power supply 117 (including the power battery holder) detected by the power-supply controller 118 and a power consumption value of the IC recorder 300 that is stored in advance.

FIG. 20 illustrates tables illustrating examples of items to be displayed as camera battery information d1 and IC-recorder battery information d2. Camera-battery information d1 indicates "PBH" when a power battery holder is attached. "Battery within camera body" corresponds to a situation in which a power battery holder is not attached, and "PBH" is not indicated.

A mark d3 in an upper-right portion of FIG. 19 indicates the link-with-directivity warning icon. Mark d4 indicates a direction in which a zoom ring is rotated. Mark d5 indicates the focal length of the zoom lens.

FIG. 21 is a table illustrating details of the link-with-directivity warning icon. In accordance with whether mark d3 is displayed, a user can determine whether a setting has been made such that the microphone directivity of the IC recorder 300 is linked with the changing of the field of view of the camera 10.

A graph d6 in FIG. 19 indicates a relationship between the field of view of the camera 10 and the microphone directivity of the IC recorder 300. The center of graph d6 corresponds to an image shooting position. Mark d7 indicates an image shooting range provided by the field of view of the camera. Mark d8 is a curve indicating the microphone directivity. The link-with-directivity warning icon and microphone directivity characteristics may be referred to as microphone directivity information.

Marks d11-d18 in FIG. 19 indicate relative directional sensitivities of the microphone for individual positions with reference to d10 at the center of the screen (0 dB). d11 indicates the microphone directional sensitivity for a center-right edge of the screen. This means that the microphone directional sensitivity is decreased at the position of the center-right edge of the screen by 0.3 dB in comparison with the center value (0 dB). d12 indicates the microphone directional sensitivity with the center-right side of the field of view enlarged by two times for an offscreen position. At this position, the microphone directional sensitivity is decreased by 3 dB in comparison with the center value (0 dB).

d13 indicates the microphone directional sensitivity for a center-left edge of the screen. d14 indicates the microphone directional sensitivity with the center-left side of the field of view enlarged by two times for an offscreen position. d15 indicates the microphone directional sensitivity for a center-top edge of the screen. d16 indicates the microphone directional sensitivity with the center-top side of the field of view enlarged by two times for an offscreen position. d17 indicates the microphone directional sensitivity for a center-bottom edge of the screen. d18 indicates the microphone directional sensitivity with the center-bottom side of the field of view enlarged by two times for an offscreen position. Accordingly, the user can intuitively determine whether the sound collecting direction and range of the sound collecting microphone are appropriate in view of the image shooting screen.

FIG. 22 illustrates exemplary directivity graphs for microphones of an IC recorder 300. As in the case of FIG. 19, d7 indicates an image shooting range provided by the field of view of the camera, and d8 is a curve indicating the directivity. The left graph indicates a curve for an omnidirectional microphone. The center graph indicates a curve for a unidirectional microphone. The right graph indicates a curve for a bidirectional microphone.

FIG. 15 should be referred to again. The system controller 101 performs a slate-tone process (step S502). FIG. depicts a subroutine illustrating a first exemplary slate-tone process. The system controller 230 determines whether the slate-tone-function button 119f has been pressed (step S700). Upon determining that the slate-tone-function button 119f has not been pressed (NO in step S700), the system controller 101 ends the first exemplary slate-tone process.

When the system controller 230 determines that the slate-tone-function button 119f has been pressed (YES in step S700), the slate-tone controller 101e performs a process corresponding to the setting of the "slate tone" menu (step S702) (this process will be described in the following). Specific examples of the "slate tone" menu will be described hereinafter by referring to FIG. 31A.

When the setting of the "slate tone" menu is Off, the slate-tone controller 101e ends the slate-tone process. When the setting of the "slate tone" menu is "On1", the slate-tone controller 101e transmits state tone command 1 from the TXD terminal 130b of the hot shoe 130 to the IC recorder 300 (step S704). "On1" indicates a mode in which a slate tone is output on the IC-recorder side.

Figure 24:
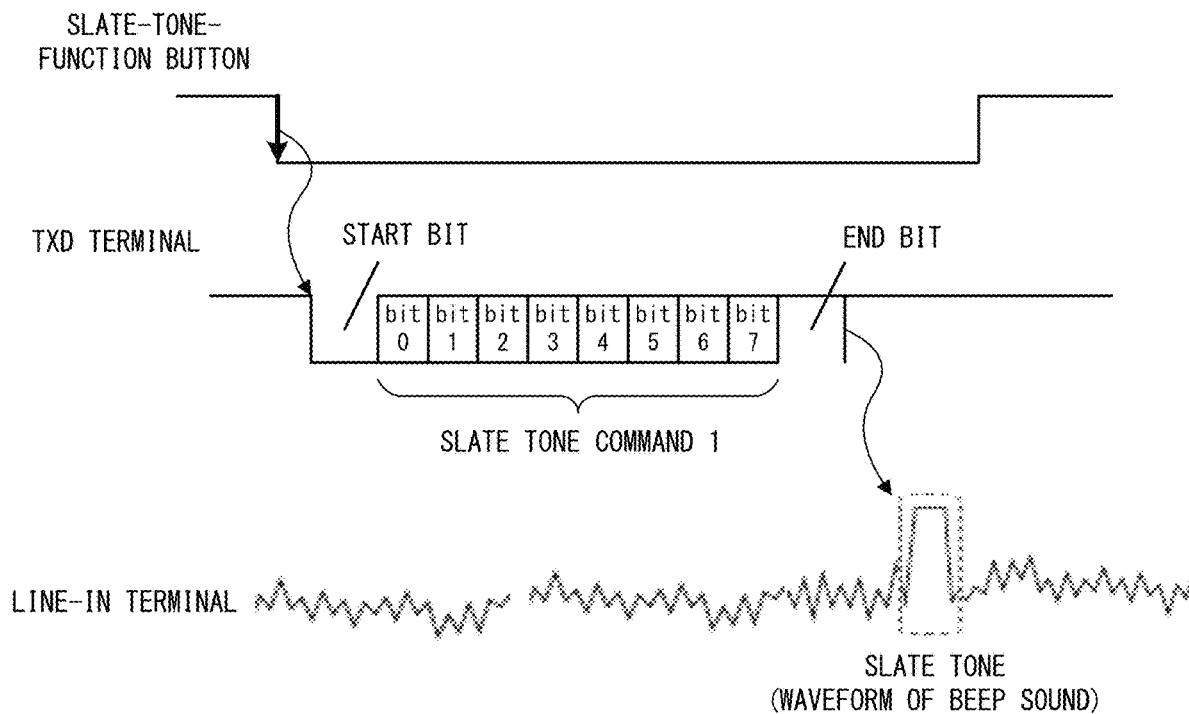
FIG. 24 is a timing chart illustrating an "On1" process of a first exemplary slate-tone process.

FIG. 24 is a timing chart illustrating an "On1" process of a first exemplary slate-tone process. When the slate-tone-function button 119f of the camera 10 is pressed, slate tone command 1 is transmitted from the TXD terminal 130b to the IC recorder 300. The communication controller 313 of the IC recorder 300 receives slate tone command 1. The system controller 301 of the IC recorder 300 generates a slate tone (also referred to as beep sound) in synchrony with an end bit of slate tone command 1.

The system controller 301 of the IC recorder 300 inserts the slate tone into sound data to be recorded by the IC recorder 300. At the same time, the system controller 301 inserts the slate tone into a sound signal to be output from the line output 310 to the camera 10.

The sound signal with the slate tone inserted thereinto is input to a terminal of the line-in input 125 of the camera 10. Hence, the slate tone is inserted into moving-image sound data to be recorded by the sound-recording controller 101a of the camera 10. In a later editing process, accordingly, for example, high-quality PCM data of sounds recorded by the IC recorder 300 may be synchronized with the slate tone and replaced with the moving-image sound data recorded by the camera 10, so that high-quality sounds can be provided without time deviation.

Figure 25:
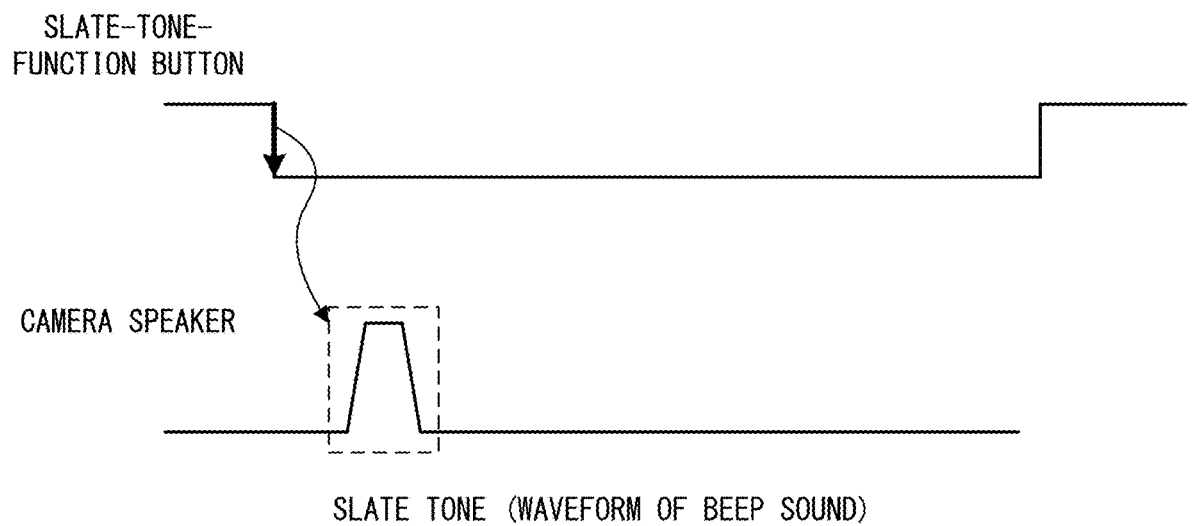
FIG. 25 is a timing chart illustrating an "On2" process of a second exemplary slate-tone process.

To allow the camera 10 to easily produce a slate tone, the camera 10 may be configured in a manner such that a beep sound is output from the speaker 123 of the camera when the slate-tone-function button 119f is pressed. An example of this is an "On2" of the first exemplary slate-tone process. FIG. 25 is a timing chart illustrating the "On2" process of the first exemplary slate-tone process. When the system controller 101 senses that the slate-tone-function button 119f of the camera 10 has been pressed, the slate-tone controller 101e outputs a slate tone from the speaker 123 of the camera (step S706). Accordingly, both the camera 10 and the IC recorder 300 record the slate tone output from the speaker 123 of the camera.

The camera 10 records, for a moving image, a beep sound produced by this camera via the internal microphone 124 or an external microphone connected to the line-in input 125. Of course, the beep sound does not necessarily need to be recorded via the internal microphone 124 or the line-in input 125 and may be directly recorded. The "On2" process allows the IC recorder 300 to record a slate tone even when the IC recorder 300 is not connected to the camera 10.

Figure 26:
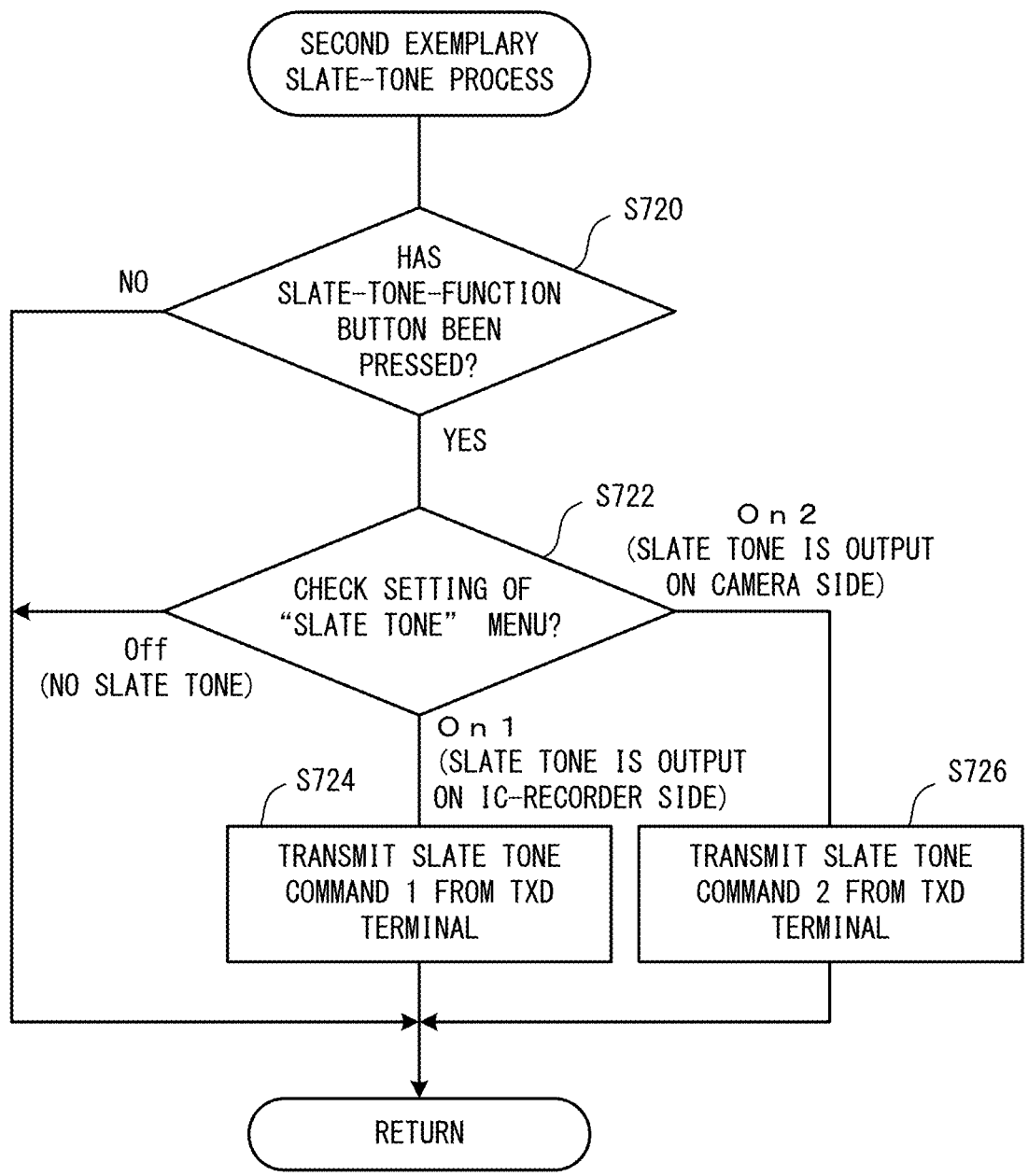
FIG. 26 depicts a subroutine illustrating a second exemplary slate-tone process.

FIG. 26 depicts a subroutine illustrating a second exemplary slate-tone process. The system controller 101 determines whether the slate-tone-function button 119*f* has been pressed (step S720). Upon determining that the slate-tone-function button 119*f* has not been pressed (NO in step S720), the system controller 230 ends the second exemplary slate-tone process.

When the system controller 101 determines that the slate-tone-function button 119*f* has been pressed (YES in step S720), the slate-tone controller 101*e* performs a process corresponding to the setting of the "slate tone" menu (step S722) (this process will be described in the following). When the setting of the "slate tone" menu is Off, the system controller 101 ends the second exemplary slate-tone process.

Figure 23:
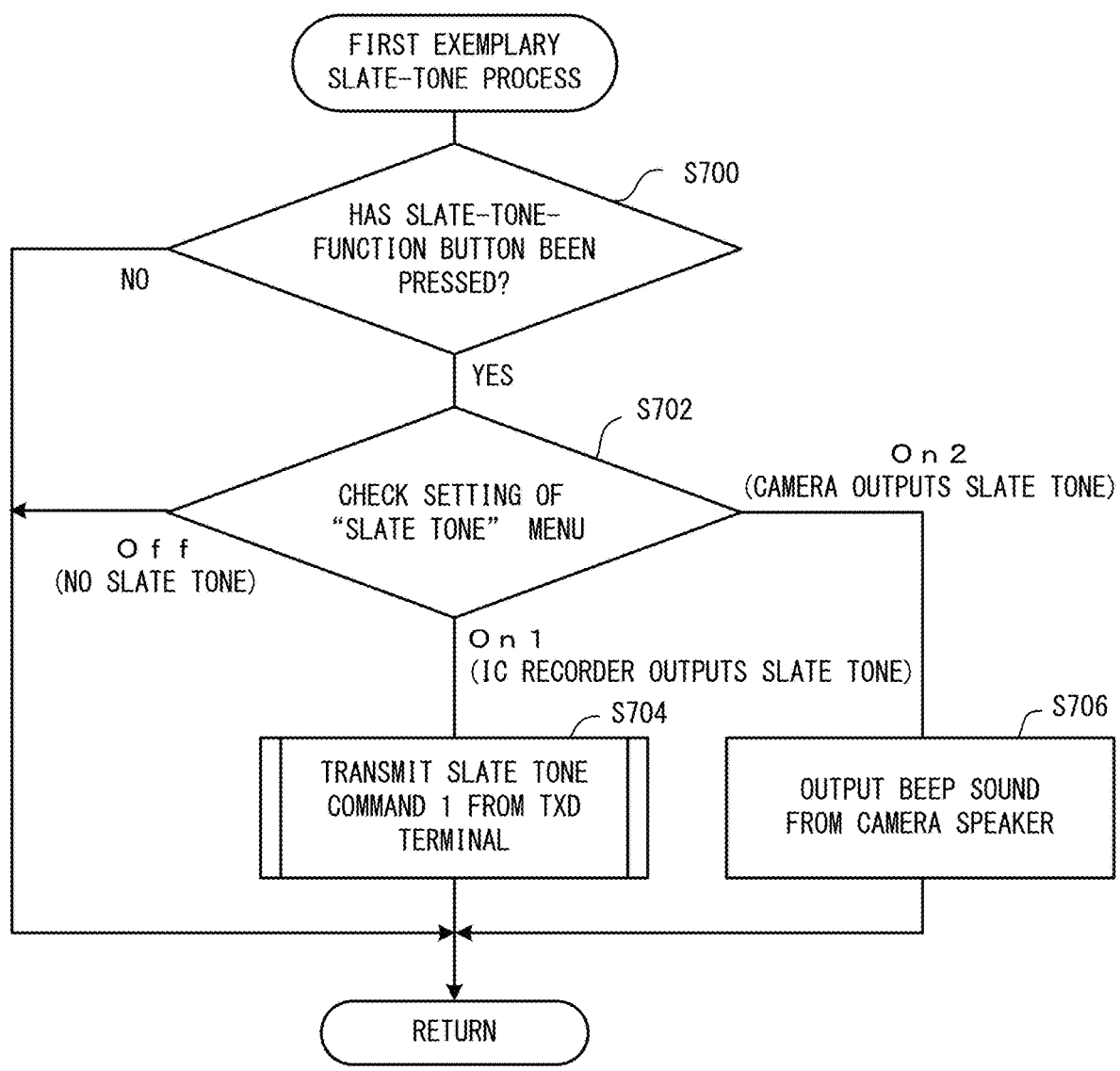
FIG. 23 depicts a subroutine illustrating a first exemplary slate-tone process.

When the setting of the "slate tone" menu is "On1", the slate-tone controller 101*e* transmits slate tone command 1 from the TXD terminal 130*b* of the hot shoe 130 to the IC recorder 300 (step S724). The process of step S724 is the same as the process of step S704 in FIG. 23, and descriptions thereof are omitted herein.

When the setting of the "slate tone" menu is "On2", the slate-tone controller 101*e* transmits slate tone command 2 from the TXD terminal 130*b* of the hot shoe 130 to the IC recorder 300 (step S726).

Figure 27:
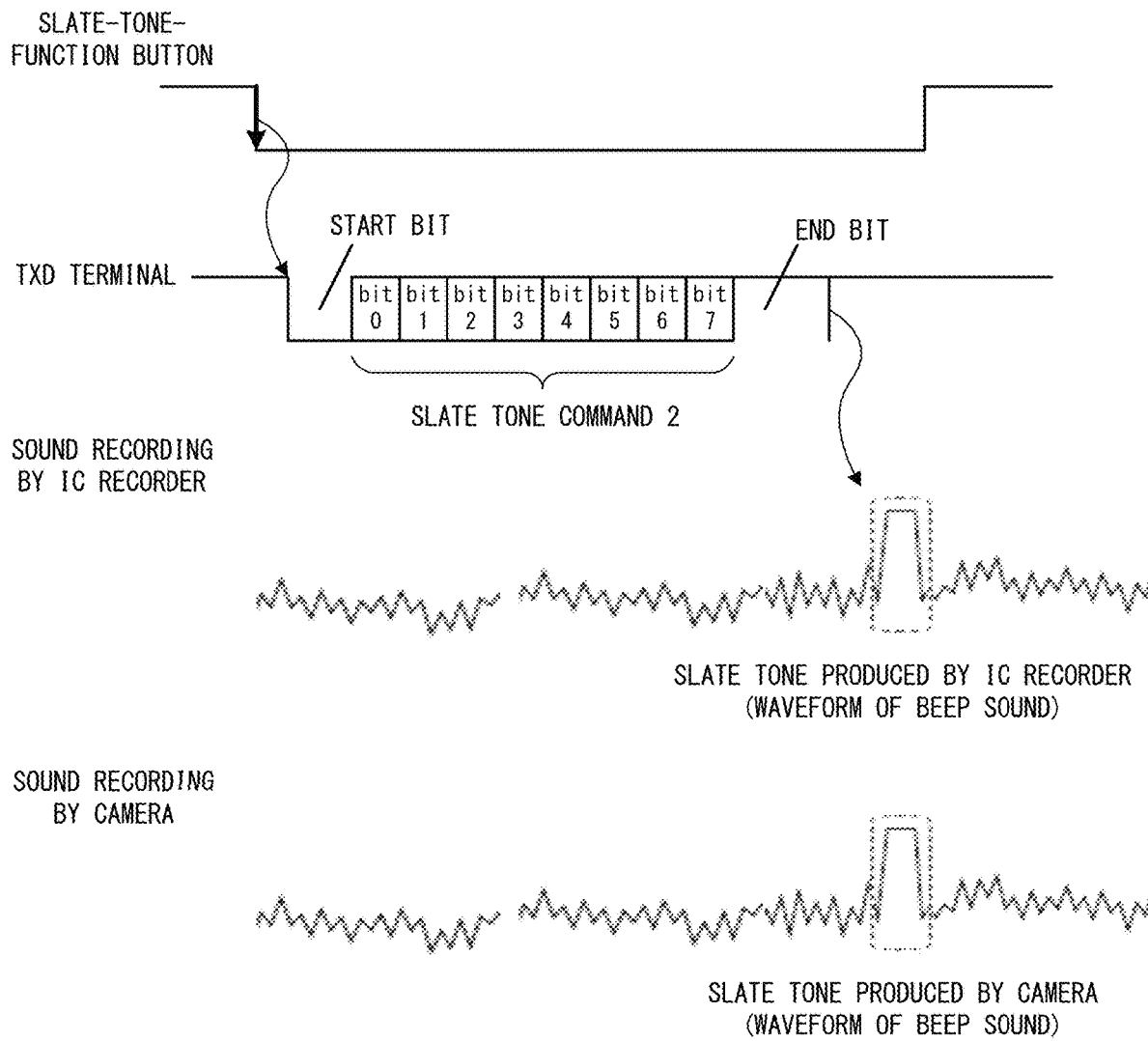
FIG. 27 is a timing chart illustrating an "On2" process of a second exemplary slate-tone process.

FIG. 27 is a timing chart illustrating an "On2" process of the second exemplary slate-tone process. Pressing the slate-tone-function button 119*f* causes the slate-tone controller 101*e* to transmit slate tone command 2 from the TXD terminal 130*b* to the IC recorder 300. Upon receipt of slate tone command 2, the system controller 301 of the IC recorder 300 provides a slate-tone (beep-sound) waveform in synchrony with an end bit of slate tone command 2.

The system controller 301 inserts the produced slate tone into a sound signal and then records this signal in the external memory 308. The slate-tone controller 101*e* of the camera 10 also produces and inserts a slate tone into a sound signal output from the IC recorder 300 (a sound signal into which a slate tone has not been inserted) and then records this signal in the external memory 121.

The second exemplary slate-tone process is an example in which the IC recorder 300 issues slate tone command 2 instead of the camera 10 actually producing a sound. The On2 process of the first exemplary slate-tone process may be such that a slate tone output from the camera speaker cannot be recorded effectively in an environment such as a concert venue where loud sounds are produced. By contrast, the second exemplary slate-tone process, in which an actual sound is not used for a slate tone, can accommodate an environment where loud sounds are produced.

The descriptions have been given on the assumption that slate tone command 2 is transmitted via the TXD terminal 130*b*, but the present invention is not limited to this. Slate tone command 2 may be wirelessly transmitted. While slate tone command 1 is supposed to be transmitted by a wired link, slate tone command 2 may be transmitted by a wired link or wirelessly.

FIG. 15 should be referred to again. The system controller 101 performs other live-view display processes (step S504) and returns to the main flow depicted in FIG. 5.

The system controller 101 determines whether the moving-image button 119*c* has been turned on (step S42). Upon determining that the moving-image button 119*c* has not been turned on (NO in step S42), the system controller 101 shifts to step S52. Upon determining that the moving-image button has been turned on (YES in step S42), the system controller 101 performs the moving-image shooting process (step S50).

Figure 28:
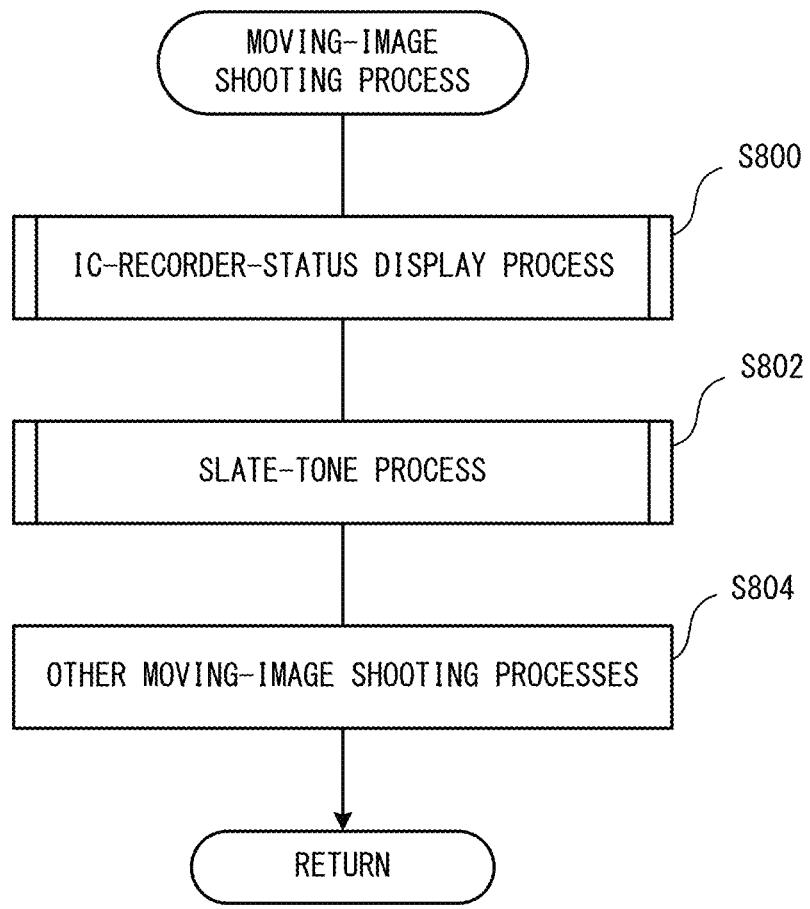
FIG. 28 illustrates a subroutine of a moving-image shooting process.

FIG. 28 illustrates a subroutine of the moving-image shooting process. The system controller 101 performs the IC-recorder-status display process (step S800). The IC-recorder-status display process has been described above with reference to FIGS. 16A and 16B.

The system controller 101 performs the slate-tone process (step S802). The slate-tone process has been described above with reference to FIGS. 23-27. The system controller 101 performs other moving-image shooting processes (step S804). Then, the process returns to the main flow depicted in FIG. 5.

The system controller 101 determines whether the first release switch has been turned on (step S52). Upon determining that the first release switch has not been turned on (NO in step S52), the system controller 101 returns to step S10. Upon determining that the first release switch has been turned on (YES in step S52), the system controller 101 determines whether the second release switch has been turned on (step S54). Upon determining that the second release switch has not been turned on (NO in step S54), the system controller 101 returns to step S10.

Upon determining that the second release switch has been turned on (YES in step S54), the system controller 101 performs the still-image shooting process (step S56). The system controller 101 determines whether a power-off instruction has been given (step S58). Upon determining that a power-off instruction has not been given (NO in step S58), the system controller 101 returns to step S10. Upon determining that a power-off instruction has been given (YES in step S58), the system controller 101 performs an end process.

Next, descriptions will be given of examples of menus displayed on the display of the camera 10. FIG. 29 illustrates sound-recording-level adjustment menus. Clicking the right button with the "sound-recording-level adjustment" selected in the movie-sound-recording setting menu (menu ME20) switches the menu to the sound-recording-level adjustment menu (menu ME21). Clicking the right button with a "built-in microphone" selected in the sound-recording-level adjustment menu switches the menu to a built-in-microphone sound-recording-level adjustment menu (menu ME22). d20, i.e., a set value for the microphone sound-recording level, indicates a sound-recording level that has been set. By operating the D-pad 119*d*, the sound-recording level is adjusted within a range from +10 to −10 of a microphone sound-recording level d21.

A level bar d22 dynamically indicates the sound level of an actual microphone. Leading segments of the displayed bar indicate maximum sound pressure levels. Even when the sound pressure is decreased, the leading segments of the level bar d22 remain at the same position for a predetermined time period. The level bar d22 is checked to determine whether the sound is excessively small or whether clipping noise has occurred due to an excessively high volume, and the microphone sound-recording level is set to an appropriate value by operating the D-pad 119*d* (up and down buttons).

Clicking the down button with the sound-recording-level adjustment menu (menu ME21) displayed selects an external microphone (menu ME23). Clicking the right button with the sound-recording-level adjustment menu (menu ME23) displayed switches the menu to an external-microphone sound-recording-level adjustment menu (menu ME24). Elements indicated in the menu ME24 such as d20, i.e., a set value for the microphone sound-recording level, are the same as those indicated in the built-in-microphone sound-recording-level adjustment menu (menu ME22).

Figure 30:
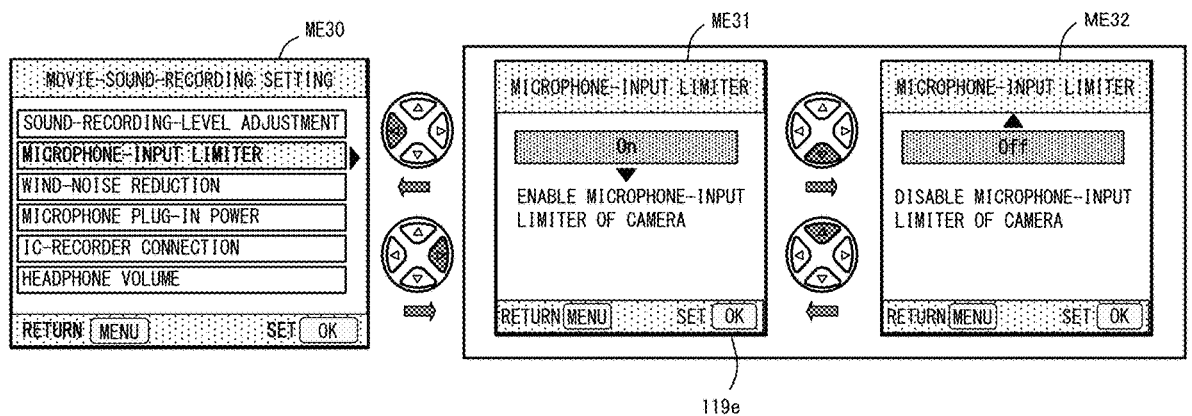
FIG. 30 illustrates examples of setting menus for a microphone-input limiter.

FIG. 30 illustrates setting menus for a microphone-input limiter. Clicking the right button with "microphone-input limiter" selected in the movie-sound-recording setting menu (menu ME30) switches the menu to one for setting the microphone-input limiter in ON state (menu ME31). Clicking the OK button 119e sets the microphone-input limiter in ON state. Clicking the down button with the menu ME31 displayed switches the menu to one for setting the microphone-input limiter in OFF state (menu ME32).

Figure 31A:
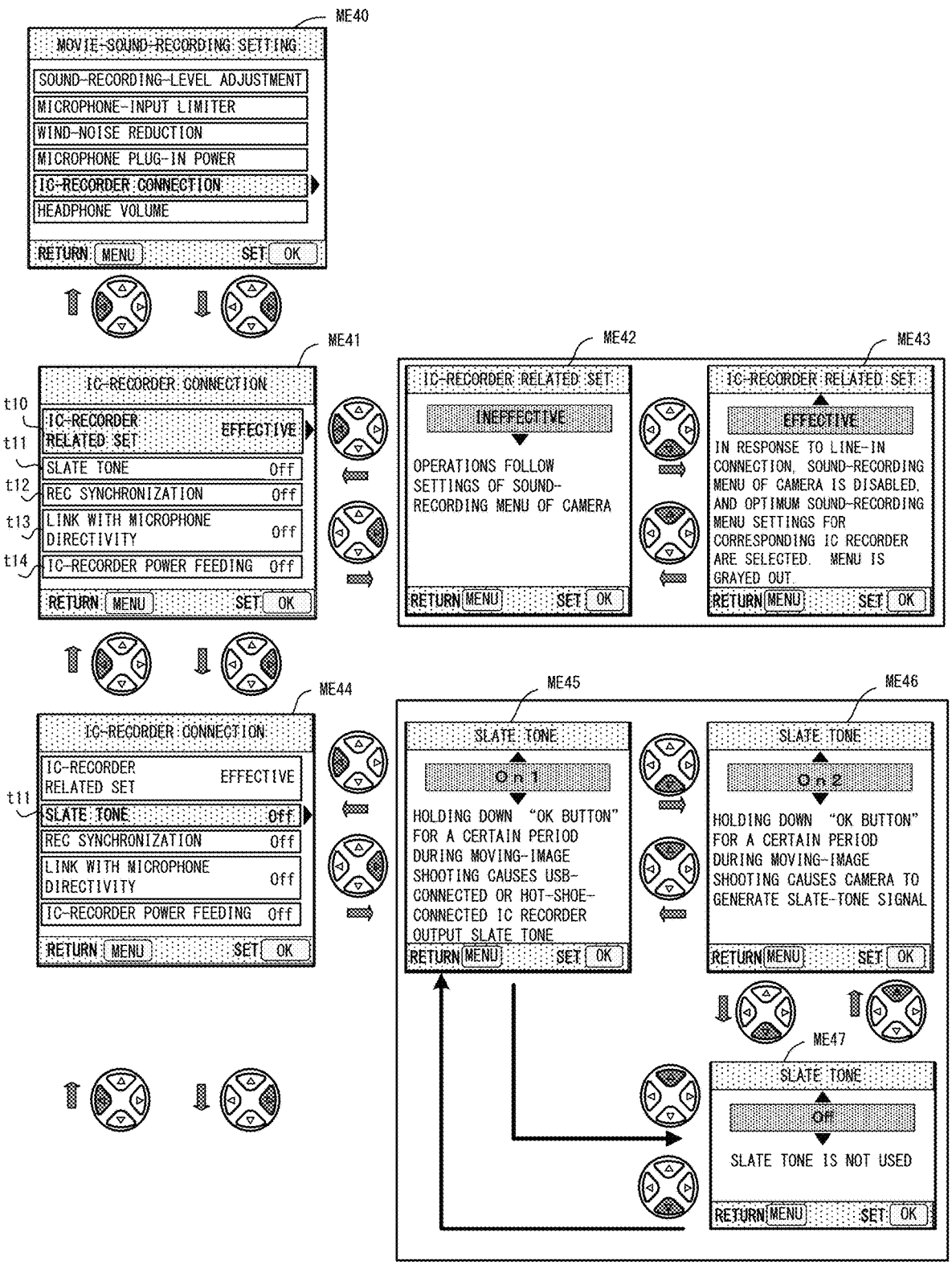
FIG. 31A illustrates exemplary menus for setting conditions while an IC recorder has been connected.
Figure 31B:
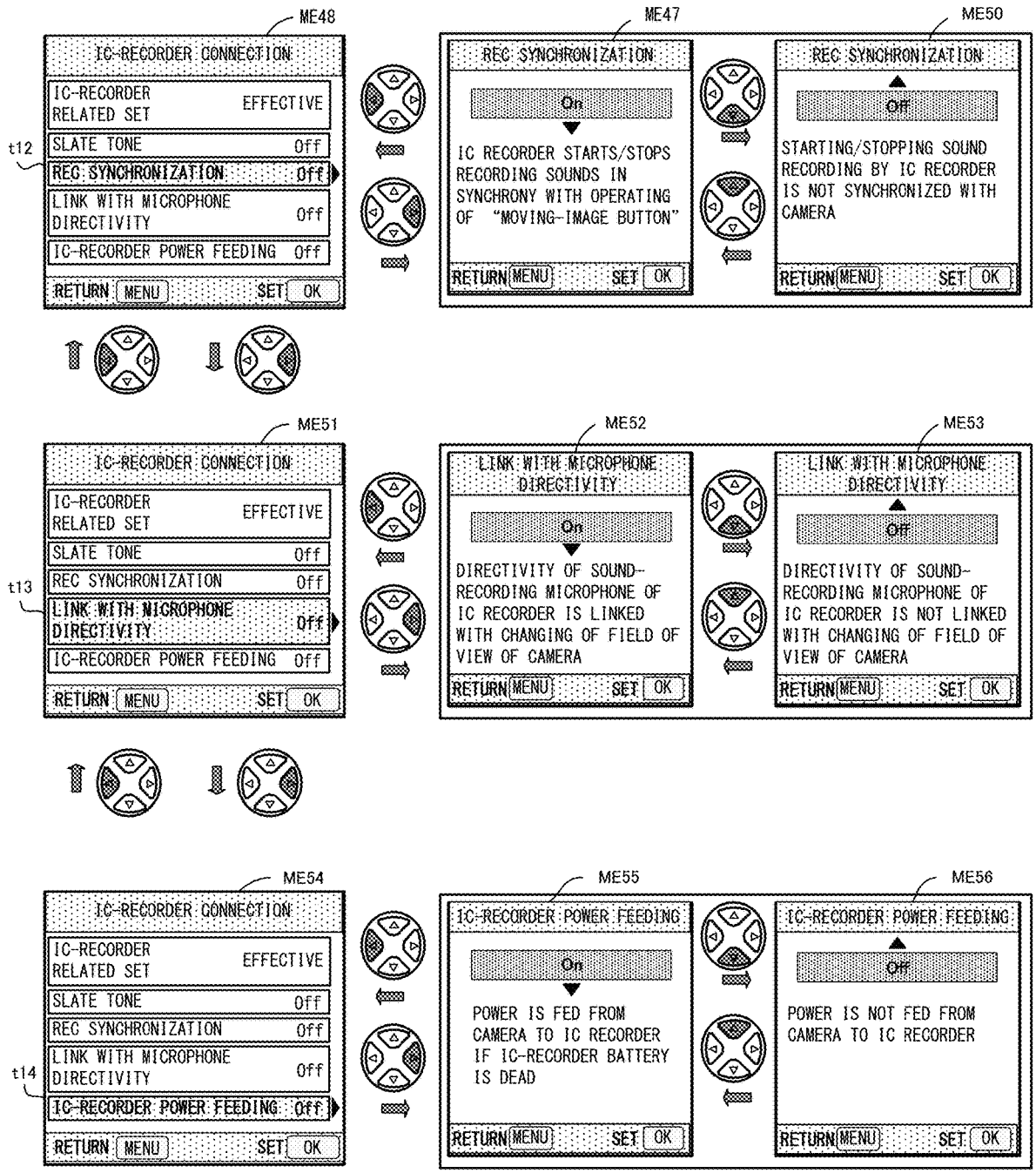
FIG. 31B illustrates exemplary menus for setting conditions while an IC recorder has been connected.

FIGS. 31A and 31B illustrate menus for setting conditions while an IC recorder has been connected. Clicking the right button with "IC-recorder connection" selected in a movie-sound-recording setting menu (menu ME40) switches the menu to an IC-recorder connection menu (menu ME41).

Clicking the right button with an "IC-recorder related set" menu t10 selected in the IC-recorder connection menu (menu ME41) switches the menu to a menu ME42 for disabling the IC-recorder related set. Clicking the down button with the menu ME42 displayed switches the menu to a menu ME43 for enabling the IC-recorder related set.

Clicking the right button with the "slate tone" menu t11 selected in the IC-recorder connection menu (menu ME41) switches the menu to a menu ME45 for setting the slate tone to On1. Clicking the down button with the menu ME45 displayed switches the menu to a menu ME46 for setting the slate tone to On2. Clicking the down button with the menu ME45 or the menu ME46 displayed switches the menu to a menu ME47 for setting the slate tone to Off.

Clicking the down button with the menu ME44 displayed switches the menu to a menu ME48 depicted in FIG. 31B. Clicking the right button with the "REC synchronization" menu t12 selected in the "IC-recorder connection menu (menu ME48)" switches the menu to a menu ME47 for setting REC synchronization to OFF state. Clicking the down button with the menu ME47 displayed switches the menu to a menu ME50 for setting REC synchronization to ON state.

Clicking the right button with the "link-with-microphone-directivity" menu t13 selected in an IC-recorder connection menu (menu ME51) switches the menu to a menu ME52 for setting the link with microphone directivity to ON state. Clicking the down button with the menu ME52 displayed switches the menu to a menu ME53 for setting the link with microphone directivity to OFF state.

Clicking the right button with the "IC-recorder power feeding" menu t14 selected in an IC-recorder connection menu (menu ME54) switches the menu to a menu ME55 for setting IC-recorder power feeding in ON state. Clicking the down button with the menu ME55 displayed switches the menu to a menu ME56 for setting IC-recorder power feeding in OFF state.

The imaging system 1 in accordance with the embodiments described herein is such that even an inexperienced user can easily make camera settings for an IC recorder connected to the camera. In addition, settings related to the IC recorder are simultaneously made, and hence a long time does not need to be spent on making the settings. It will be costly to install recording functions for achieving a high sound quality in a camera. Accordingly, high-quality sounds may be recorded in an IC recorder and replaced with sounds recorded by the camera after image shooting so as to provide high-quality moving-image sounds.

The embodiments are such that sound-recording conditions pertaining to an IC recorder are fixed and cannot be changed while the IC recorder is connected to the camera, thereby preventing sound-recording conditions from being incorrectly set. Conditions fixed for the IC recorder are displayed to be distinguishable from other conditions, and hence the user does not have a difficulty in operating the camera.

The embodiments are such that the mounting of an IC recorder on the camera is automatically detected, and hence settings do not need to be manually made for the mounting of the IC recorder.

Power is supplied from the camera to an IC recorder, thereby preventing the IC recorder from having a power shortage. In addition, the remaining battery level of the IC recorder is displayed on the camera and thus can be easily monitored.

An IC recorder is mounted on the hot shoe and thus firmly held.

The descriptions herein are based on the assumption that the system controller 101 of the camera 10 is implemented through software processing performed by a CPU that has read a program, but the system controller 101 may be partly or totally implemented by hardware.

The embodiments herein can provide an imaging system that allows settings to be easily made for an IC recorder connected thereto.

The present invention is not limited to the described embodiments and may be achieved in an implementation phase with components modified without departing from the gist of the invention. Various inventions may be provided by combining, as appropriate, a plurality of components disclosed with reference to the embodiments. For example, all components indicated with reference to an embodiment may be combined as appropriate. Moreover, components of different embodiments may be combined as appropriate. Various modifications and applications can be provided in this way without departing the gist of the invention.

The invention claimed is:

1. An imaging system comprising:
a sound-recording apparatus; and
an imaging apparatus that is connected to the sound-recording apparatus and records, as moving-image sounds under a set sound-recording condition, sounds collected by the sound-recording apparatus,
wherein the sound-recording condition includes a sound-recording condition that is capable of being changed by a user and a sound-recording condition that is associated with the sound-recording apparatus and incapable of being changed by a user, and
wherein the imaging apparatus
detects whether the sound-recording apparatus has been connected to the imaging apparatus, and
upon detecting that the sound-recording apparatus has been connected thereto, sets as the sound-recording condition, the sound-recording condition that is associated with the sound recording apparatus and incapable of being changed by a user.

2. The imaging system of claim 1, wherein
upon detecting that the sound-recording apparatus has been connected to the imaging apparatus, the imaging apparatus fixedly sets at least one of (A) a sound-recording adjustment, (B) a microphone limiter, (C) wind noise, and (D) a microphone plug-in power, as the sound-recording condition incapable of being changed by a user.

3. The imaging system of claim 1, wherein
the imaging apparatus displays, on a menu screen for setting sound-recording conditions, the set sound-recording condition incapable of being changed by a user in such a manner as to be distinguishable from other sound-recording conditions.

4. The imaging system according to claim 1, wherein
the imaging apparatus distinguishably displays, on a menu screen for setting the sound-recording condition that is capable of being changed by a user, the sound-recording condition that is capable of being changed by a user and the sound-recording condition that is associated with the sound-recording apparatus and incapable of being changed by a user.

5. An imaging apparatus that is connected to a sound-recording apparatus and records, as moving-image sounds, sounds collected by the sound-recording apparatus, the imaging apparatus comprising:
a memory; and
a processor connected to the memory, wherein
the processor
detects whether the sound-recording apparatus has been connected to the imaging apparatus,
upon detecting that the sound-recording apparatus has been connected to the imaging apparatus, sets a sound-recording condition associated with the sound-recording apparatus as a sound-recording condition for the imaging apparatus in a sound recording process, the sound-recoding condition including a sound-recording condition that is associated with the sound-recording apparatus and incapable of being changed by a user.

\* \* \* \* \*